US006721921B1

(12) United States Patent
Altman

(10) Patent No.: US 6,721,921 B1
(45) Date of Patent: Apr. 13, 2004

(54) METHOD AND SYSTEM FOR ANNOTATING DOCUMENTS USING AN INDEPENDENT ANNOTATION REPOSITORY

(75) Inventor: Ian K. Altman, Potomac, MD (US)

(73) Assignee: ITM Associates, McLean, VA (US)

(*) Notice: Subject to any disclaimer, the term of this patent is extended or adjusted under 35 U.S.C. 154(b) by 199 days.

(21) Appl. No.: 09/575,712

(22) Filed: Jul. 26, 2000

(51) Int. Cl.[7] .............................................. G06F 17/30
(52) U.S. Cl. ...................................................... 715/512
(58) Field of Search ........................ 707/512; 345/764, 345/751, 753; 715/512

(56) References Cited

U.S. PATENT DOCUMENTS

| | | | | |
|---|---|---|---|---|
| 5,146,552 A | * | 9/1992 | Cassorla et al. | 707/512 |
| 5,239,466 A | * | 8/1993 | Morgan et al. | 707/512 |
| 5,596,700 A | * | 1/1997 | Darnell et al. | 707/512 |
| 5,706,452 A | * | 1/1998 | Ivanov | 345/751 |
| 5,761,419 A | * | 6/1998 | Schwartz et al. | 709/204 |
| 5,826,025 A | * | 10/1998 | Gramlich | 709/217 |
| 6,088,702 A | * | 7/2000 | Plantz et al. | 707/103 R |
| 6,151,021 A | * | 11/2000 | Berquist et al. | 345/764 |
| 6,266,683 B1 | * | 7/2001 | Yehuda et al. | 707/512 |
| 6,342,906 B1 | * | 1/2002 | Kumar et al. | 345/751 |
| 6,411,314 B1 | * | 6/2002 | Hansen et al. | 345/769 |
| 6,438,564 B1 | * | 8/2002 | Morton et al. | 715/500 |
| 6,542,165 B1 | * | 4/2003 | Ohkado | 345/751 |
| 6,546,405 B2 | * | 4/2003 | Gupta et al. | 715/512 |

OTHER PUBLICATIONS

Adobe Systems Incorporated, A Quick Tour of Adobe Acrobat, c1999, pp. 1–20.
Adobe Systems Incorporated, Adobe announces the next generation with new interface, features, Mar. 12, 2001, 3 pages Found http://www.planetpdf.com/mainpage.asp?webpageid=1237.
Adobe Systems Incorporated, What's new in Adobe Acrobat 5.0, c2002, 2 pages Found at http://www.adobe.com/products/acrobat/newfeatures.html.
Adobe Systems Incorporated, Adobe Acrobat 5.0 New Feature Highlights, c2001, 7 pages Found at http://www.adobe.com/products/acrobat/pdfs/acrnfhs.pdf.
Adobe Systems Incorporated, Adobe Acrobat 4.0 Guide, c1999, pp. 1–643.

* cited by examiner

Primary Examiner—Sanjiv Shah
(74) Attorney, Agent, or Firm—Oblon, Spivak, McClelland, Maier & Neustadt, P.C.

(57) ABSTRACT

A method and system for generating workflow messages based on adding annotations to a file repository or database independent of an original document that they annotate. By separately storing the annotations in a searchable annotation repository, original documents can be preserved unchanged while still providing the ability to comment on the original document. By generating workflow messages, a system can track who has reviewed a document, whose proposed changes and/or comments require action by another person, and if everyone has reviewed the documents within the time constraints established.

14 Claims, 24 Drawing Sheets

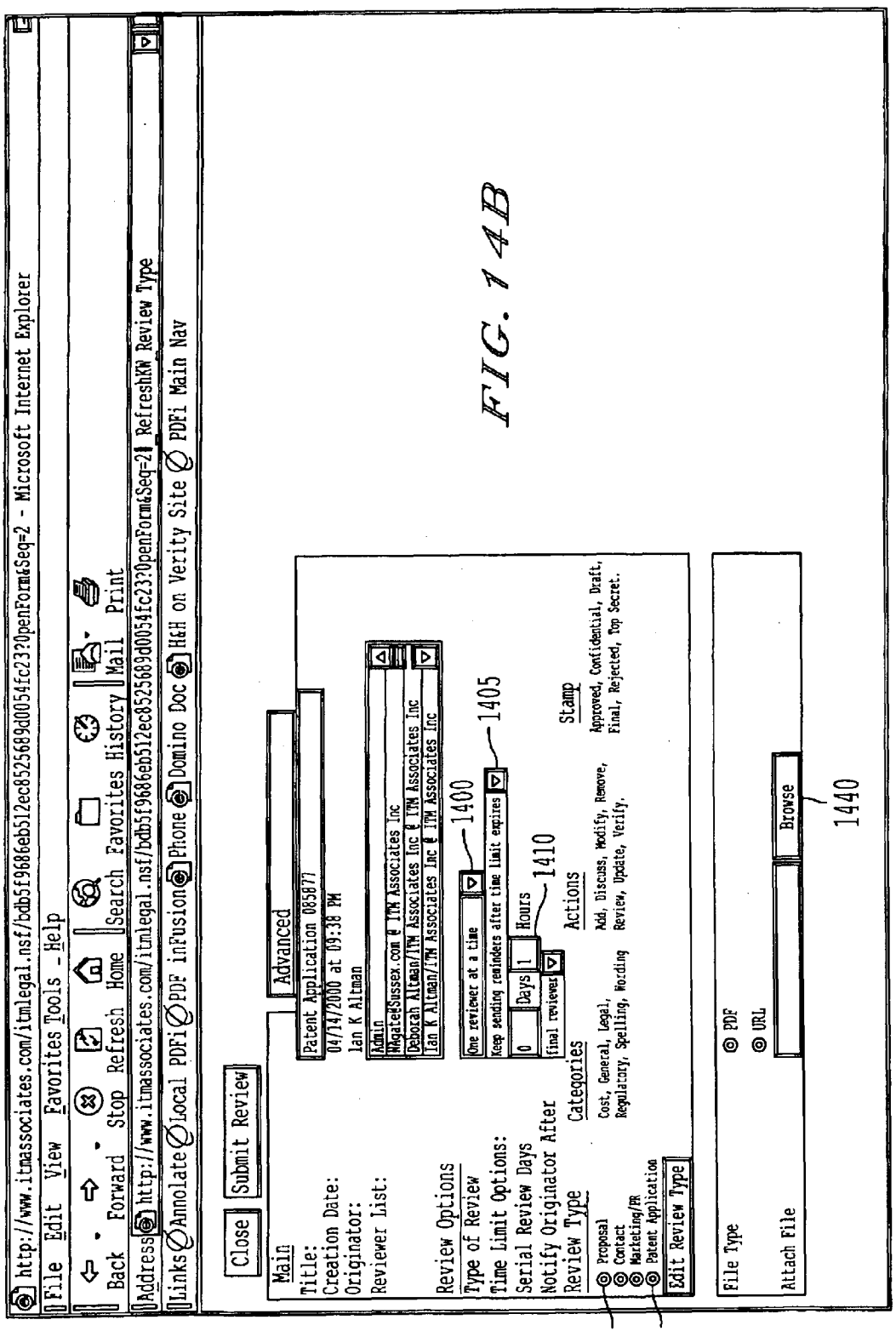

METHOD AND SYSTEM FOR ANNOTATING DOCUMENTS USING AN INDEPENDENT ANNOTATION REPOSITORY

BACKGROUND OF INVENTION

The present invention relates to a document annotation system and more particularly to a document management system that enables (1) documents (containing one or a combination of images and text) to be annotated with searchable text that is stored independently from the underlying scanned documents and (2) the annotation of those documents to cause workflow rules to be triggered.

Various software packages have been built to manage computer generated and/or scanned documents. One such software package is ADOBE ACROBAT by Abode Systems that enables Portable Document Format (PDF) files to be written. (A more limited functionality PDF reader is also available under the tradename Abode Acrobat Reader.) In addition to the "native" features that are available, ADOBE ACROBAT can be augmented with additional functionality using "plug-ins" that conform to an Application Programming Interface (API).

Various texts have been written describing some of the features of ADOBE ACROBAT. Examples of such texts include: "PDF Printing and Workflow," by Frank J. Romano, published by Prentice Hall (Oct. 20, 1998), ISBN: 013020837X; Adobe Acrobat Forms Set, By Adobe Developer Technologies, Published by Adobe Systems Inc., Published: January 2000, ISBN: DM10003157; Adobe Acrobat Interapplication Communication Documentation Set, By Adobe Developer Technologies, Published by Adobe Systems Inc., Date Published: February 2000, ISBN: DM10002537; Portable Document Format Reference Manual, Version 1.3, by Adobe Systems; Acrobat Software Development Kit (SDK), Version 4.05; Adobe Acrobat Forms Data Format (FDF) Toolkit SDK; and Abode Technical Notes 5167, 5182, 5190, 5191, 5164, 5165, 5183, 5157, 5158, 5151, 5181, 5193, 5194, 5162, 5160, 5192, 5400, 5172, 5150, and 5159, each revised November, 2000. Each of those references is incorporated herein by reference in their entirety. As shown in FIG. 6.1 of Portable Document Format Reference Manual, Version 1.3, ADOBE ACROBAT enables annotations to be stored within a PDF file such that they may be retrieved and/or searched later. An exemplary annotation is shown in FIG. 1. However, the embedding of those annotations within the file also prevents them from being easily searched by non-ADOBE ACROBAT applications. Software Development Kit (SDK), Version 4.05; Adobe Acrobat Forms Data Format (FDF) Toolkit SDK; and Abode Technical Notes 5167, 5182, 5190, 5191, 5164, 5165, 5183, 5157, 5158, 5151, 5181, 5193, 5194, 5162, 5160, 5192, 5400, 5172, 5150, and 5159, each revised November, 2000. Each of those references is incorporated herein by reference in their entirety. As shown in FIG. 6.1 of Portable Document Format Reference Manual, Version 1.3, Adobe Acrobat enables annotations to be stored within a PDF file such that they may be retrieved and/or searched later. An exemplary annotation is shown in FIG. 1. However, the embedding of those annotations within the file also prevents them from being easily searched by non-Adobe Acrobat applications.

In addition, database software packages are also available from various manufacturers. Such software includes, but is not limited to, Lotus Notes, SQL Server from Microsoft Corporation, and Oracle8i from Oracle Corporation. Such software enables data to be stored in and retrieved from the corresponding databases.

SUMMARY OF INVENTION

It is an object of the present invention to provide at least one of a text overlay and a graphic overlay for a displayable computer document (e.g., a PDF file) where the overlay and the image are stored separately and the addition, modification or deletion of parts of the overlay cause workflow rules to be triggered.

This object and other advantages of the present invention are addressed by at least one computer system in which information of a first type (e.g., a textual or graphic annotation) is stored in a first location and a document of a second type (e.g., a scanned image or a computer generated file) is stored in a second location. In one embodiment, the first and second locations are different files and/or databases of a single computer. Alternately, in another embodiment, the first and second locations are file systems of two different computers connected via a network.

BRIEF DESCRIPTION OF DRAWINGS

A more complete appreciation of the invention and many of the attendant advantages thereof will become readily apparent with reference to the following detailed description, particularly when considered in conjunction with the accompanying drawings, in which:

FIG. 8B is a screen capture showing the exemplary user interface of FIG. 8A expanded by using the details arrow;

FIG. 13A is a screen capture of an exemplary interface for creating a review of a document specified in the attach file box;

FIG. 14B is a screen capture of an exemplary interface showing the proposal review options of a document selected in FIG. 13A or 13B, using serial review, one reviewer at a time;

FIG. 15 is a screen capture of an exemplary interface showing the proposal review options of a document selected in FIG. 13A or 13B, using parallel review between all reviewers simultaneously without a specified time limit;

Figure 16:
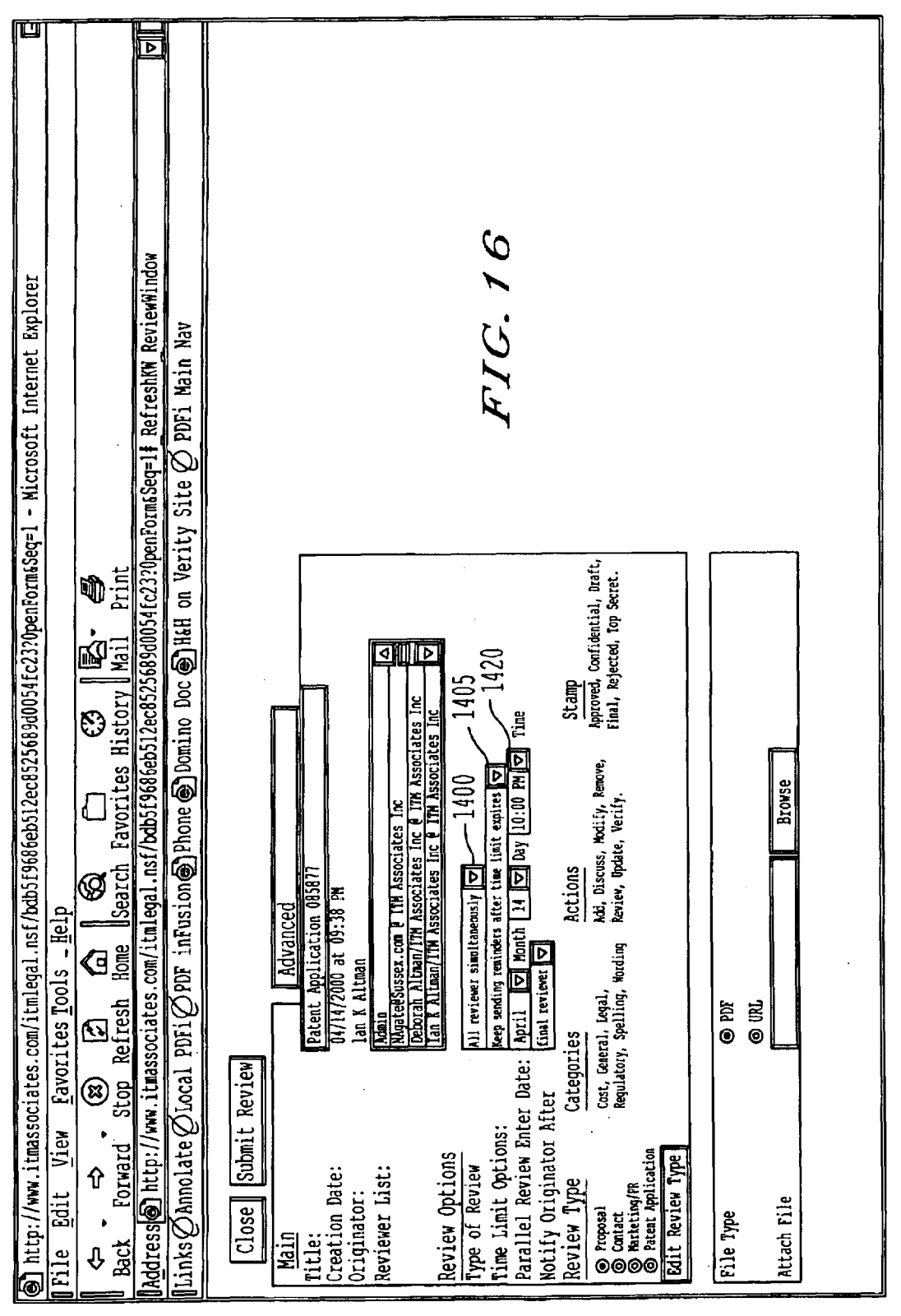

FIG. 16 is a screen capture of an exemplary interface showing the proposal review options of a document selected in FIG. 13A or 13B, using parallel review between all reviewers with a specified enter time;

DETAILED DESCRIPTION

Figure 1:
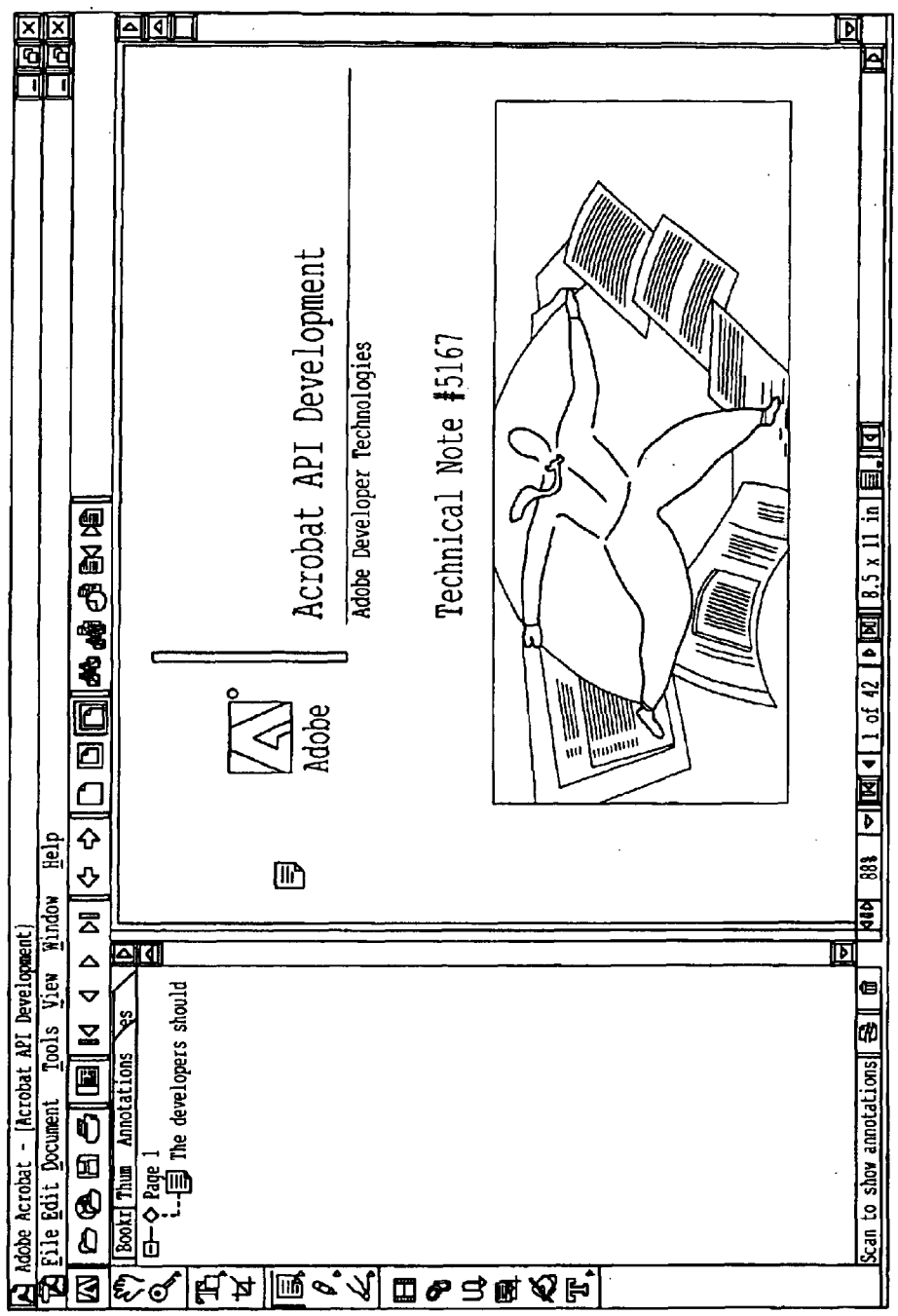
FIG. 1 is a screen capture of an annotation applied to a Portable Document Format (PDF) file.
Figure 2:
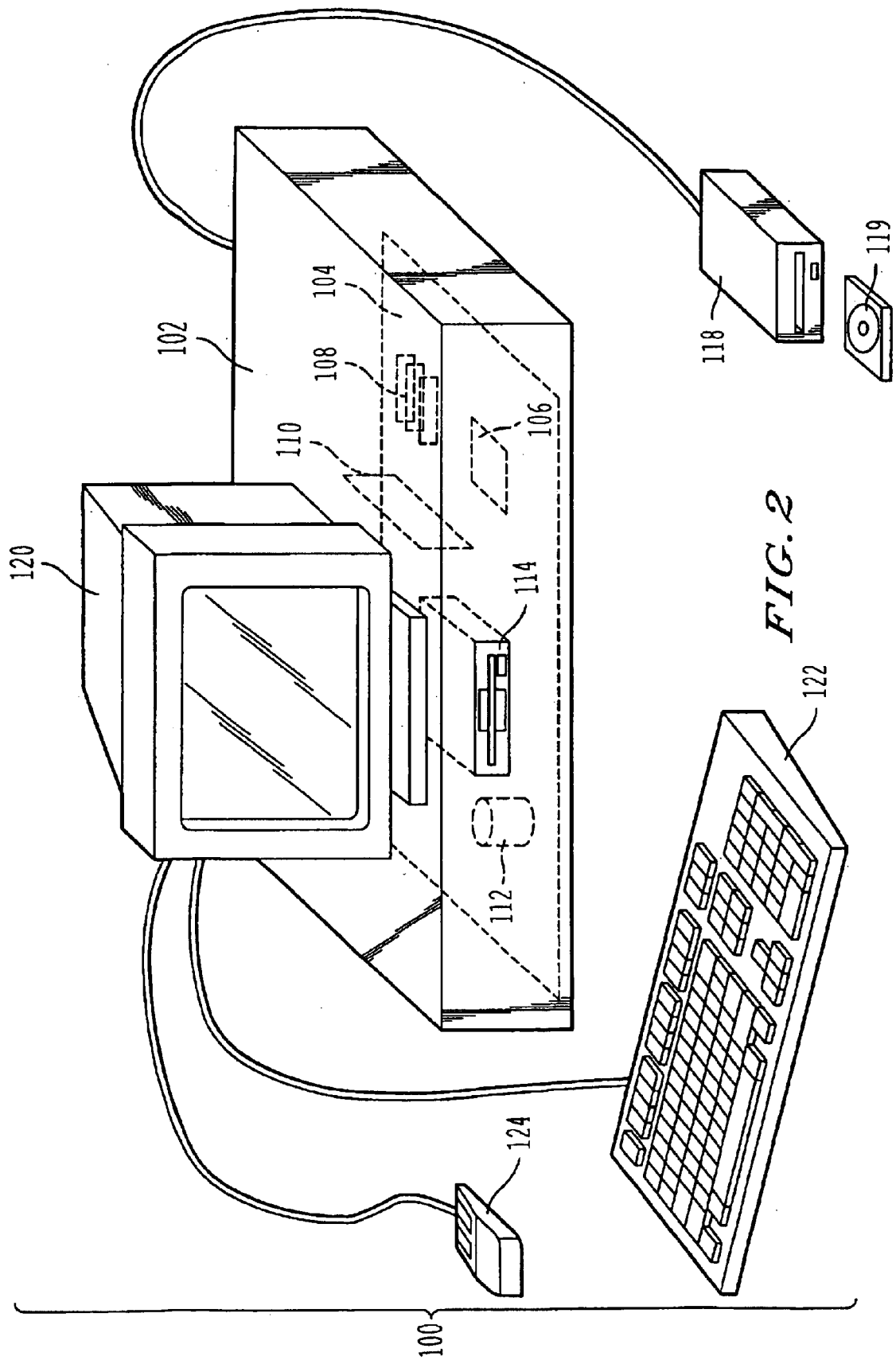
FIG. 2 is a schematic illustration of a computer for providing the services of the present invention.

Referring now to the drawings, in which like reference numerals designate identical or corresponding parts throughout the several views, FIG. 2 is a schematic illustration of a computer system for managing annotations for documents, either locally or using a wide area network (e.g., the Internet). A computer 100 implements the method of the present invention, wherein the computer housing 102 houses a motherboard 104 which contains a CPU 106, memory 108 (e.g., DRAM, ROM, EPROM, EEPROM, SRAM, SDRAM, and Flash RAM), and other optional special purpose logic devices (e.g., ASICs) or configurable logic devices (e.g., GAL and reprogrammable FPGA). The computer 100 also includes plural input devices, (e.g., a keyboard 122 and mouse 124), and a display card 110 for controlling monitor 120. In addition, the computer system 100 further includes a floppy disk drive 114; other removable media devices (e.g., compact disc 119, tape, and removable magneto-optical media (not shown)); and a hard disk 112, or other fixed, high density media drives, connected using an appropriate device bus (e.g., a SCSI bus, an Enhanced IDE bus, or a Ultra DMA bus). Also connected to the same device bus or another device bus, the computer 100 may additionally include a compact disc reader 118, a compact disc reader/writer unit (not shown) or a compact disc jukebox (not shown). Although compact disc 119 is shown in a CD caddy, the compact disc 119 can be inserted directly into CD-ROM drives that do not require caddies. In addition, a printer (not shown) also provides printed listings of annotations stored externally to an original document.

As stated above, the system includes at least one computer readable medium. Examples of computer readable media are compact discs 119, hard disks 112, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for storing and managing annotations for original documents external to those original documents. The computer code devices of the present invention can be any interpreted or executable code mechanism, including but not limited to scripts (including Active Server pages), interpreters, dynamic link libraries, Java classes, and complete executable programs. These computer code devices may run on either one of, or on a combination of, a client and a server computer. Information on providing Web services is provided in the following references which are incorporated herein by reference: (1) Visual Studio Core Reference Set, by Microsoft Press, (2) Visual InterDev 6.0: Web Technologies Reference, by Microsoft Press, (3) Professional Active Server Pages 2.0 by Francis et al., published by WROX Press Ltd., (4) Oracle PL/SQL Programming by Scott Urman, Published: March 1996, (5) Hitchhikers Guide to Visual Basic and SQL Server: with CD-ROM, by William Vaughn, Published: May 1997, (6) Using Microsoft SQL Server 6.5 (Special Edition) by Stephen Wynkoop, Published: March 1997, and (7) Advanced PowerBuilder 6 Techniques by Ramesh Chandak.

Figure 3A:
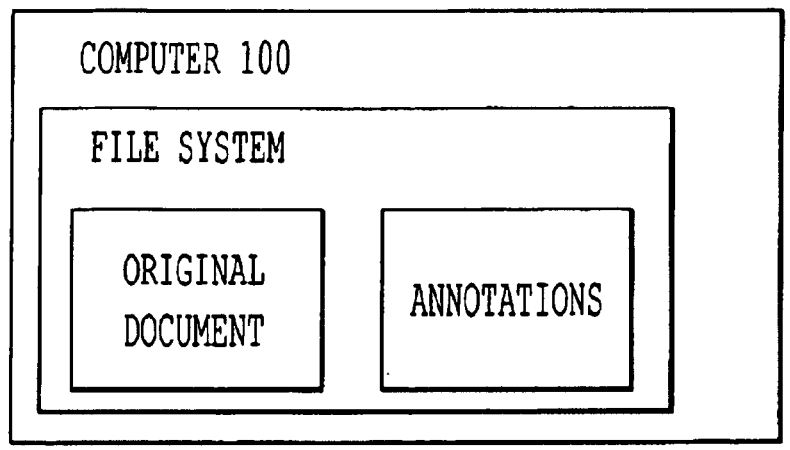
FIG. 3A is a block diagram of a first embodiment of the present invention in which original documents and their annotations are stored on a single computer.
Figure 4A:
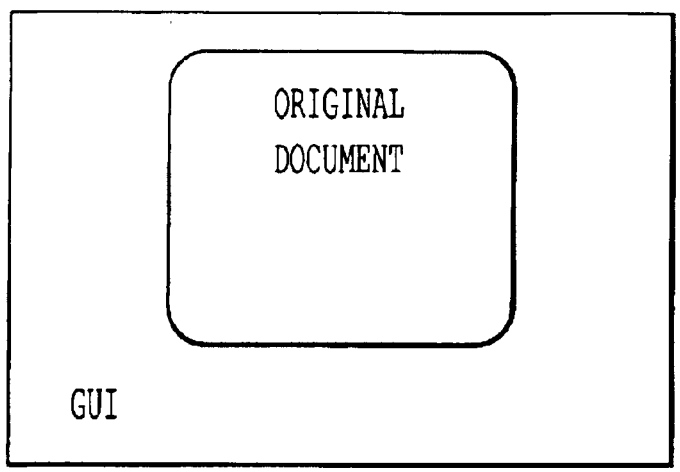
FIG. 4A is a block diagram showing a graphical user interface (GUI) displaying an original document.
Figure 4B:
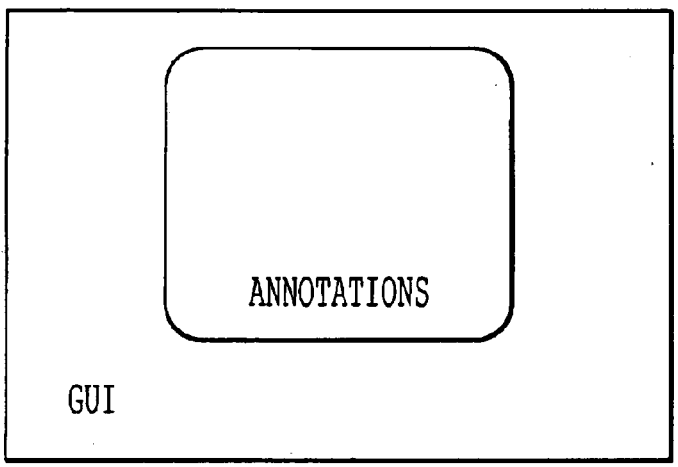
FIG. 4B is a block diagram showing the GUI of FIG. 4A displaying a set of annotations.
Figure 4C:
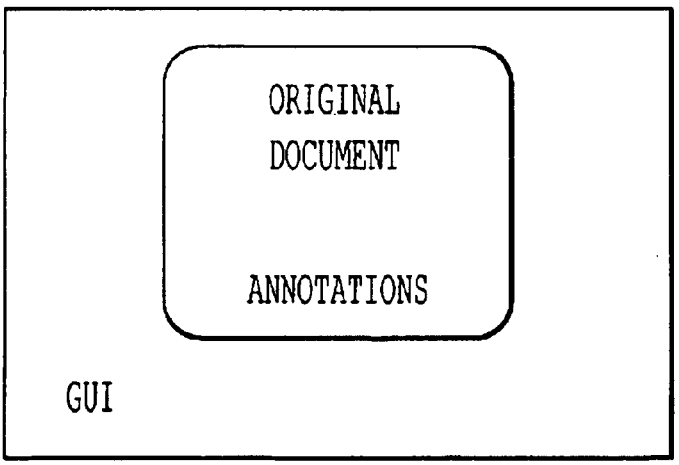
FIG. 4C is a block diagram showing the GUI of FIG. 4A displaying an original document overlaid with the annotations of FIG. 4B.

Turning now to FIG. 3A, a stand-alone computer 100 stores in one or more separate file systems both original documents and annotations. As shown in FIGS. 4A–4C, using a graphical user interface (GUI) of the computer 100, a user can combine the separately stored original documents and annotations. An advantage of such a separation is that the original document need not be altered directly. This enables the original document to be stored as a read-only file. Moreover, the annotations can be made immutable, i.e., write-once with multiple reads, but they cannot be overwritten. This speeds up access to the annotations and removes the need for complicated version control logic. Another advantage of this distributed annotations model is that it is possible to annotate a document that is not in the same system as the annotator or annotations. The annotations manager need only be pointed to the location of the document (e.g., by using a URL of the PDF ) such that the manager can read the document in—even if the manager cannot write to the file.

Figure 5:
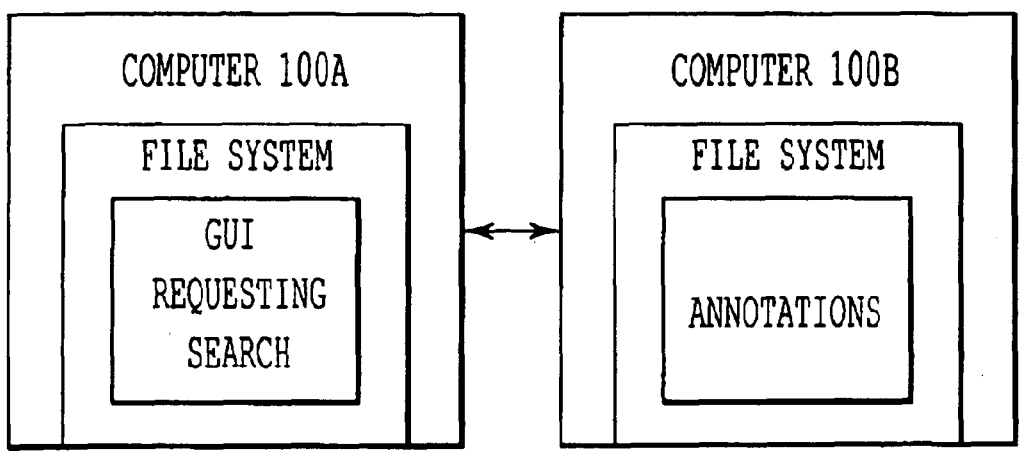
FIG. 5 is a block diagram showing that a first computer can perform a search of remotely stored annotations.

As shown in FIG. 5, the computer code devices of the computer 100 control the GUI to determine what portion of which page(s) of a document is being displayed and what annotations need to be superimposed on that portion. For example, in one embodiment of the present invention, a Web browser acts as the graphical user interface using an annotations plug-in (e.g., an ADOBE ACROBAT Reader plug-in). In another embodiment, Lotus Notes acts as a primary GUI, with a plug-in modifying the standard interface of Lotus Notes. Plug-ins can be implemented in a fashion known to those of ordinary skill in the art (e.g., as a computer code device written as a C++programming language dynamic linked library). The plug-in (annotations manager) determines what portion (e.g., described as a bounding box) of what page is currently being displayed using an Application Program Interface (API) associated with ADOBE ACROBAT. The annotation manager than queries an annotation repository (e.g., a database) to determine if any annotations are present in that area.

Figure 6:
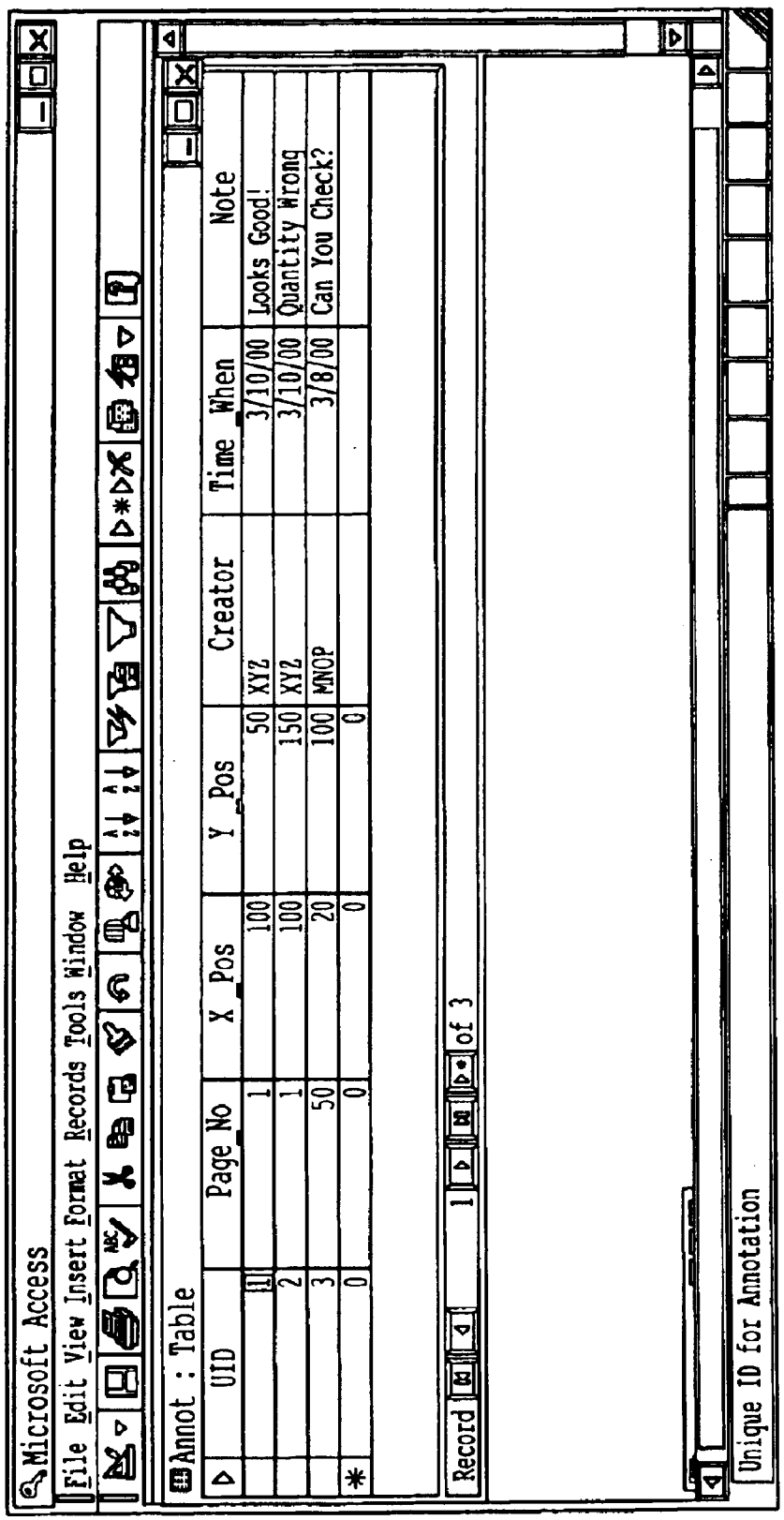
FIG. 6 is a screen capture showing an exemplary database structure for storing annotations external to an original document.

By way of an example, turning to FIG. 6, the annotation manager queries a database to determine the annotations on page 1. As a result, the database returns two records indicating that annotations with UIDs equal to 1 and 2 are present on page 1. The annotation manager can then parse out the x and y locations of those annotations (e.g., from the x_pos and y_pos fields, respectively), and superimpose the corresponding text if the corresponding portions of the page are displayed. In an alternate embodiment of annotations of varying sizes, the database may likewise contain an additional coordinate pair (e.g., (x_extent, y_extent)) that specifies, in conjunction with the base coordinate (e.g., (x_pos, y_pos)) the bounds of where the annotation is displayed. In one such embodiment, all coordinates are expressed in native coordinates of a PDF file.

As would be evident to one of ordinary skill in the art from the present disclosure, the database of FIG. 6 could likewise contain a field that distinguishes between textual and graphical annotations. In such an embodiment, the "Note" field could be re-used to include the filename or Uniform Resource Locator (URL) of the corresponding graphic to be displayed at the specified location. In yet another embodiment, at least one graphic is associated with each text annotation such that the user is shown an icon (or other image) corresponding to a minimized annotation. Upon activating the minimized icon (e.g., by clicking on it with a mouse), the text annotation is displayed, either superimposed on the original document or in a separate window of the GUI.

Figure 3B:
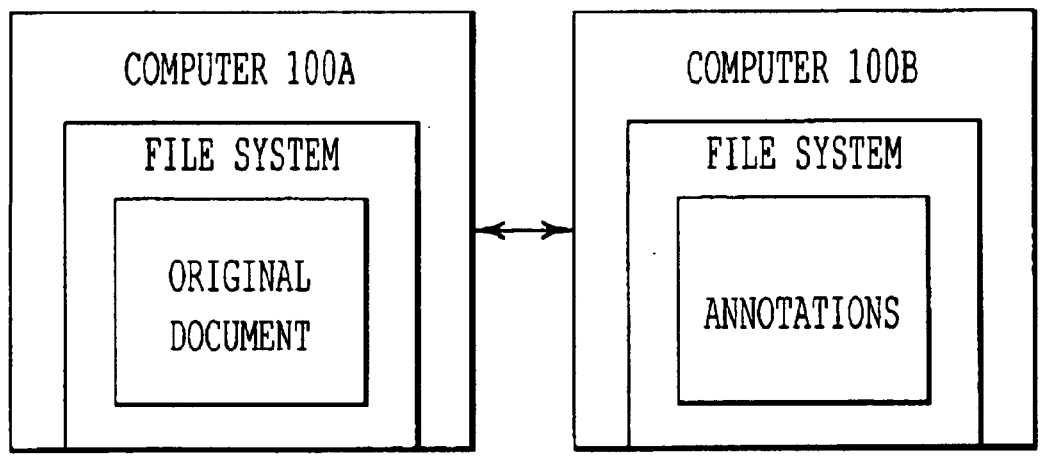
FIG. 3B is a block diagram of a second embodiment of the present invention in which original documents and their annotations are stored on a separate computers connected via a network.

Returning to FIG. 3B, in an alternate embodiment of the present invention, the annotations and the original documents are not stored on a single machine. Instead, a first computer 100A stores the original documents, and a second computer 100B stores the annotations (e.g., in a Lotus Notes database). The annotations and original documents can be combined using the network connecting the two computers 100A and 100B.

As would be understood by one of ordinary skill in the art, the annotations may also include drawn annotations (e.g., using free-hand or pre-defined shapes) and highlighting. Highlighting provides the illusion of changing the color of the underlying original document while still being able to see the original document through the highlighting. As with all annotations of the present invention, highlighting is done without changing the contents of the original document.

In order to create a new text annotation, the text tool of the annotation manager displays (or "pops up") a typing area in which the annotation can be typed. That annotation is then written back to the annotation repository. The annotations may be written back for storage in any form specified by the communication protocol between the annotation manager and the annotation repository. In one embodiment, the annotation is written back in eXtended Markup Language (XML) to enable flexible processing of the annotation by at least one third-party program.

In order to modify an existing text annotation, the annotation manager requests from the annotation repository an existing annotation specified by a user (through the GUI). The retrieved annotation is then displayed as an overlay or in a separate window.

Figure 7:
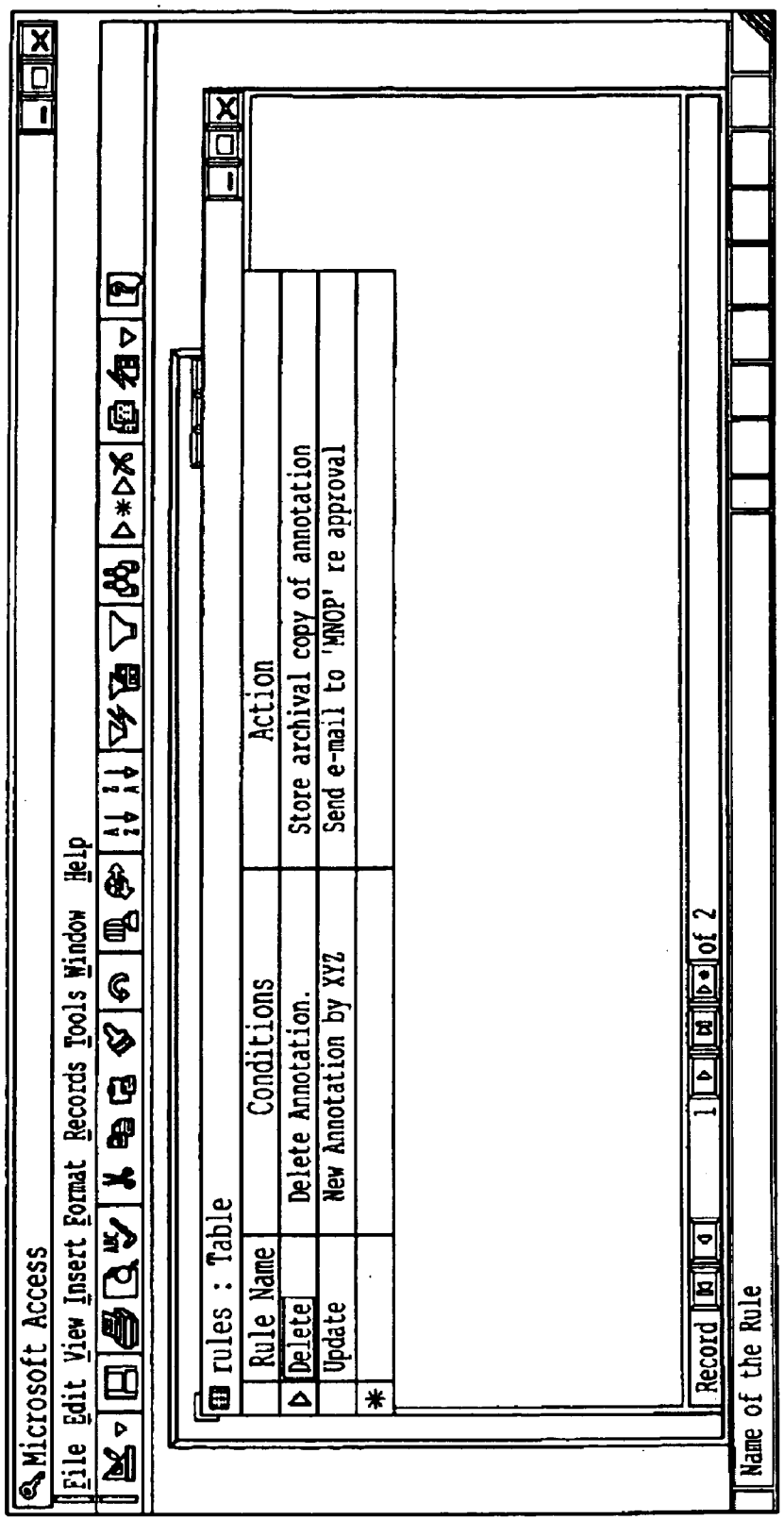
FIG. 7 is a screen capture showing an exemplary structure for storing rules triggered by the creation of a new annotation or the modification of an existing annotation.
Figure 17:
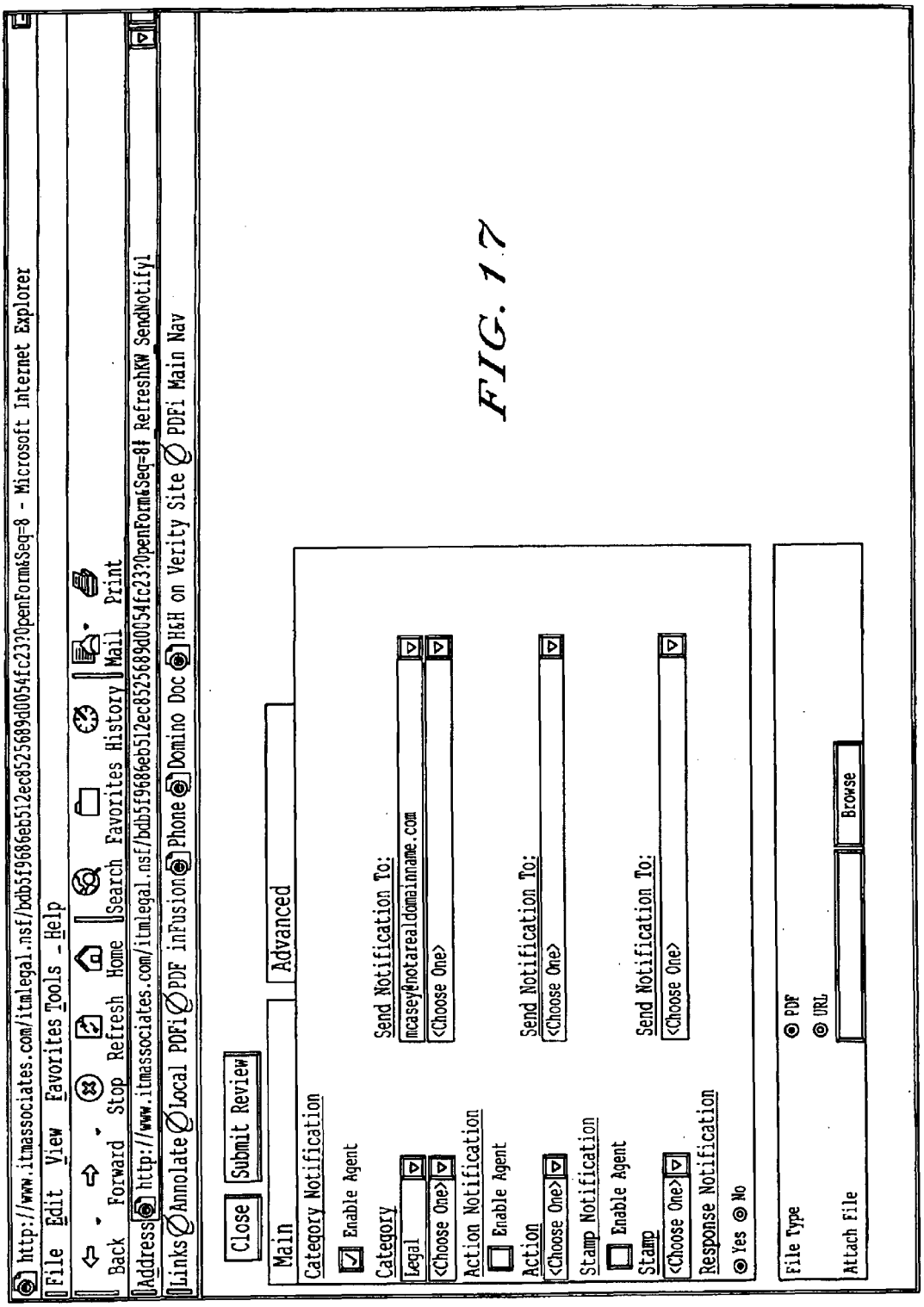
FIG. 17 is a screen capture of an exemplary interface showing the rules triggered by a category, action or stamp.

Creation of a new annotation and/or the modification of an existing annotation can cause the annotation manager to perform processing specified in a set of processing rules. For example, as shown in FIG. 7 in pseudo rules and pseudo commands, the deletion of an annotation always triggers storage of an archival copy of the annotation. This prevents annotations from inadvertently becoming irretrievable. Similarly, the "Update" rule of FIG. 7 causes an e-mail to be sent to "MNOP" for each new annotation that "XYZ" makes. Such a procedure may be required where an architect or professional engineer needs to approve changes to a blueprint. Similarly, a senior associate or partner may need to approve all annotations to documents that have been included in a privilege log. (Additional rule processing is explained in more detail with reference to FIG. 17, below.)

As would be understood by one of ordinary skill in the art, the rules and/or commands may be written in any language supported by the annotation repository. For example, the addition of a record to a Lotus Notes database can be used to trigger the condition checking and rules processing described above. In this way, the condition checking code need not be rewritten. Instead, the Lotus Notes services can be re-used.

As would be appreciated by one of ordinary skill in the art, the communication between the annotation manager and the annotation repository may either be implicit (e.g., using database calls) or explicit (e.g., using TCP/IP sockets or using a Java communications interface).

Figure 8A:
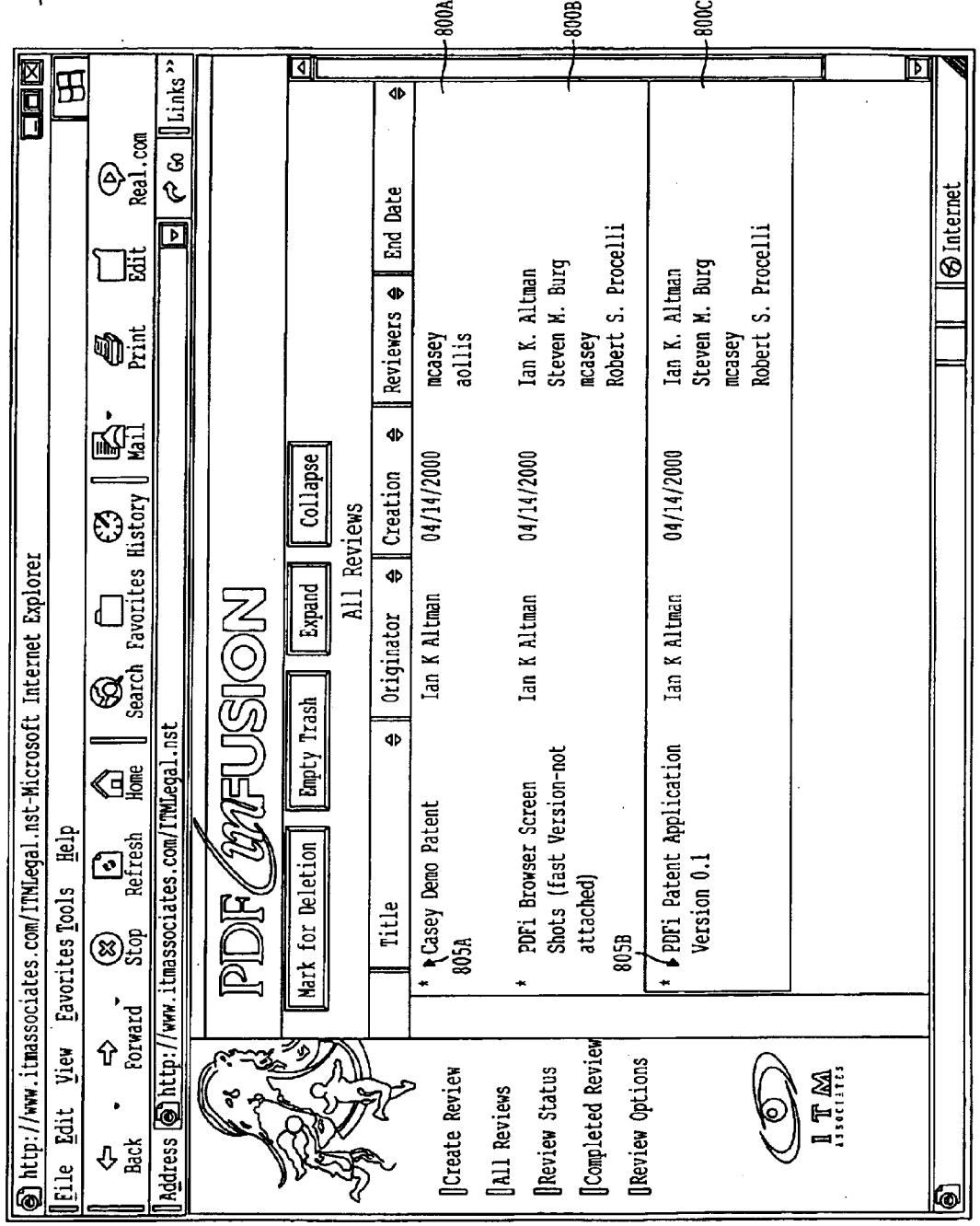
FIG. 8A is a screen capture showing an exemplary user interface for selecting at least one review of a set of reviews accessible by a user.

Additional details of the present invention are discussed herein using actual captured computer screen images. FIG. 8A is a screen capture showing an exemplary user interface for selecting at least one review of a set of reviews accessible by a user. (As would be appreciated by one of ordinary skill in the art, to get to such an interface, a user is required to authenticate himself/herself to the remote information server (i.e., to the Web server in the exemplary embodiment). Such authentication may be way of a username and password, a certificate, or any other authentication technique.) Accordingly, the user "mcasey" has logged into the system and has access to three different documents that can be selected by links 800A, 800B, and 800C. As shown, each document is illustrated as having a title, an originator, a creation date, a list of reviewers, and an end-date. As would be evident to one of ordinary skill in the art, other information categories about documents could also be provided.

Figure 8B:
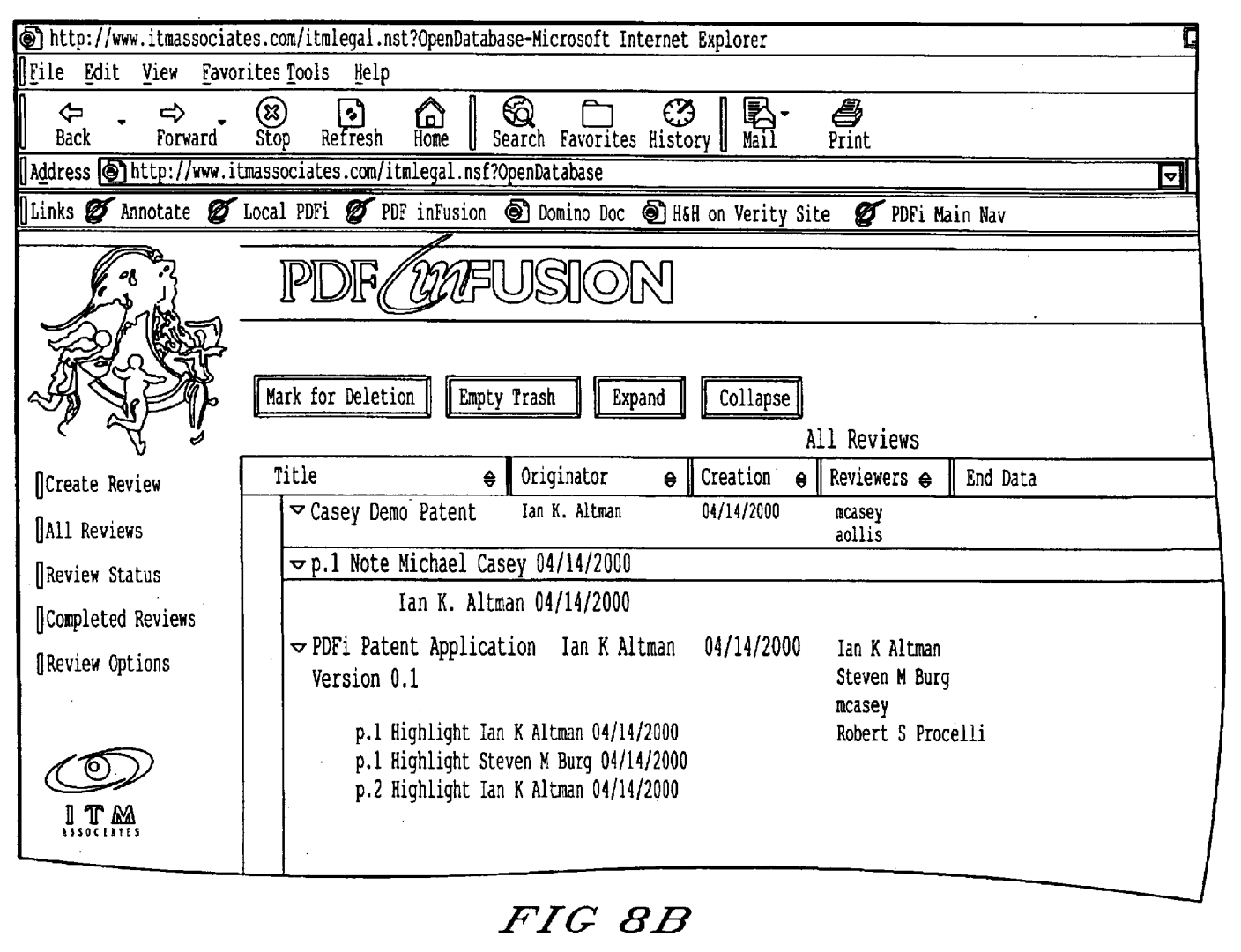

In one embodiment, each user interface also includes a "details" arrow 805A and 805B that allows a user to select additional/expanded details about any one of the documents. Once a corresponding arrow (805A or 805B) has been selected, the corresponding arrow is rotated, and the additional detail is shown. FIG. 8B is a screen capture showing the exemplary user interface of FIG. 8A expanded by using the details arrow. In one embodiment of the present invention, such detail is provided using Dynamic HTML (DHTML). In an alternate embodiment of the present invention, such detail is provided using JavaScript. In yet an alternate embodiment of the present invention, such detail is provided using a combination of DHITML and JavaScript.

Figure 9A:
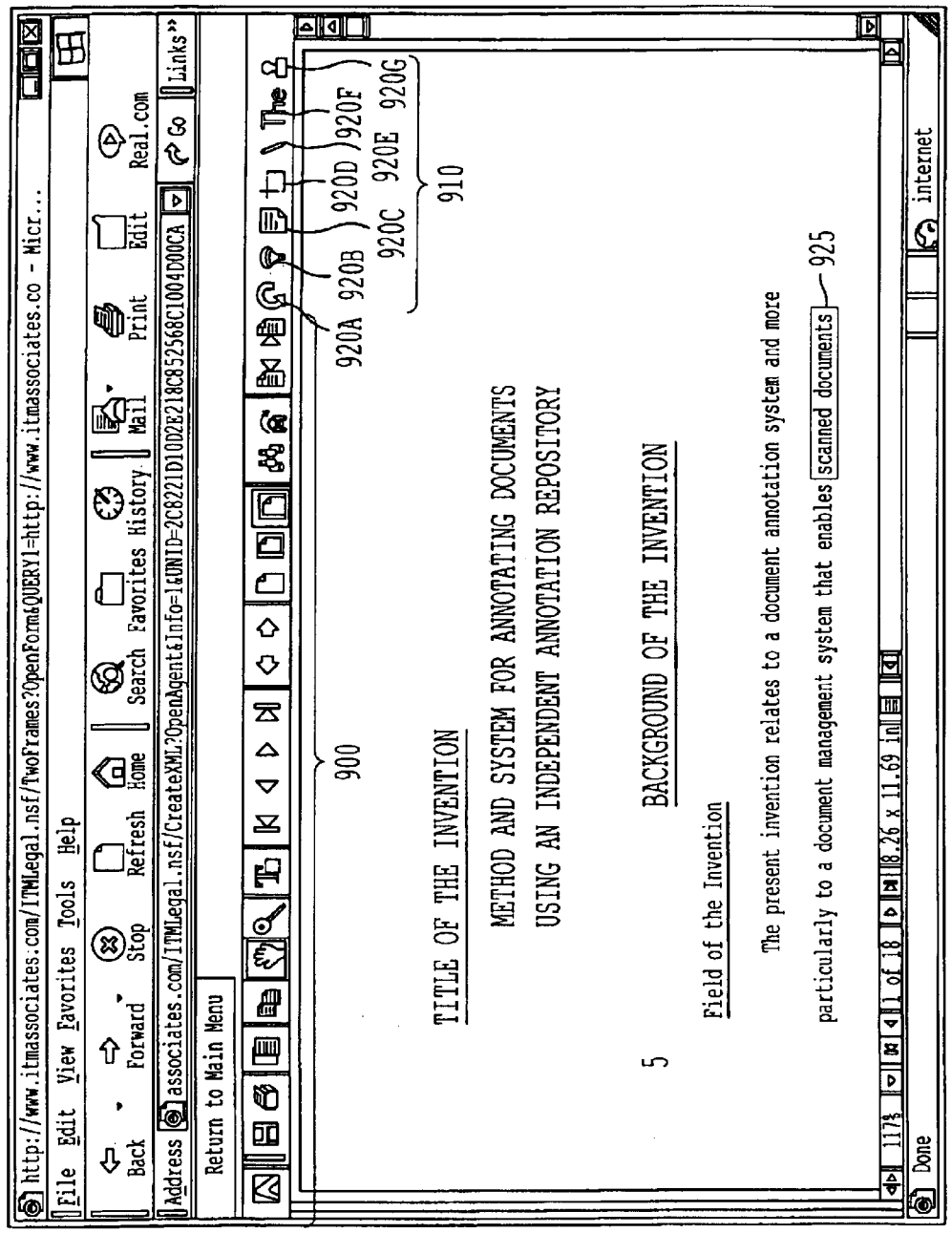
FIG. 9A is a screen capture showing an exemplary user interface, including a native toolbar and a supplemental toolbar, for annotating an electronic document.

FIG. 9A is a screen capture showing an exemplary user interface, including a native toolbar 900 and a supplemental toolbar 910, for annotating an electronic document. In one embodiment of the present invention, to achieve the dual toolbars, ADOBE ACROBAT acts as a first plug-in to a browser (e.g., the Microsoft browser as illustrated), and then the system of the present invention acts as a second plug-in to ADOBE ACROBAT. In one embodiment of the present invention, a second log-in sequence is used to authenticate the second plug-in (i.e., the plug-in to Acrobat) to the information server of database server providing the annotations.

Figure 9B:
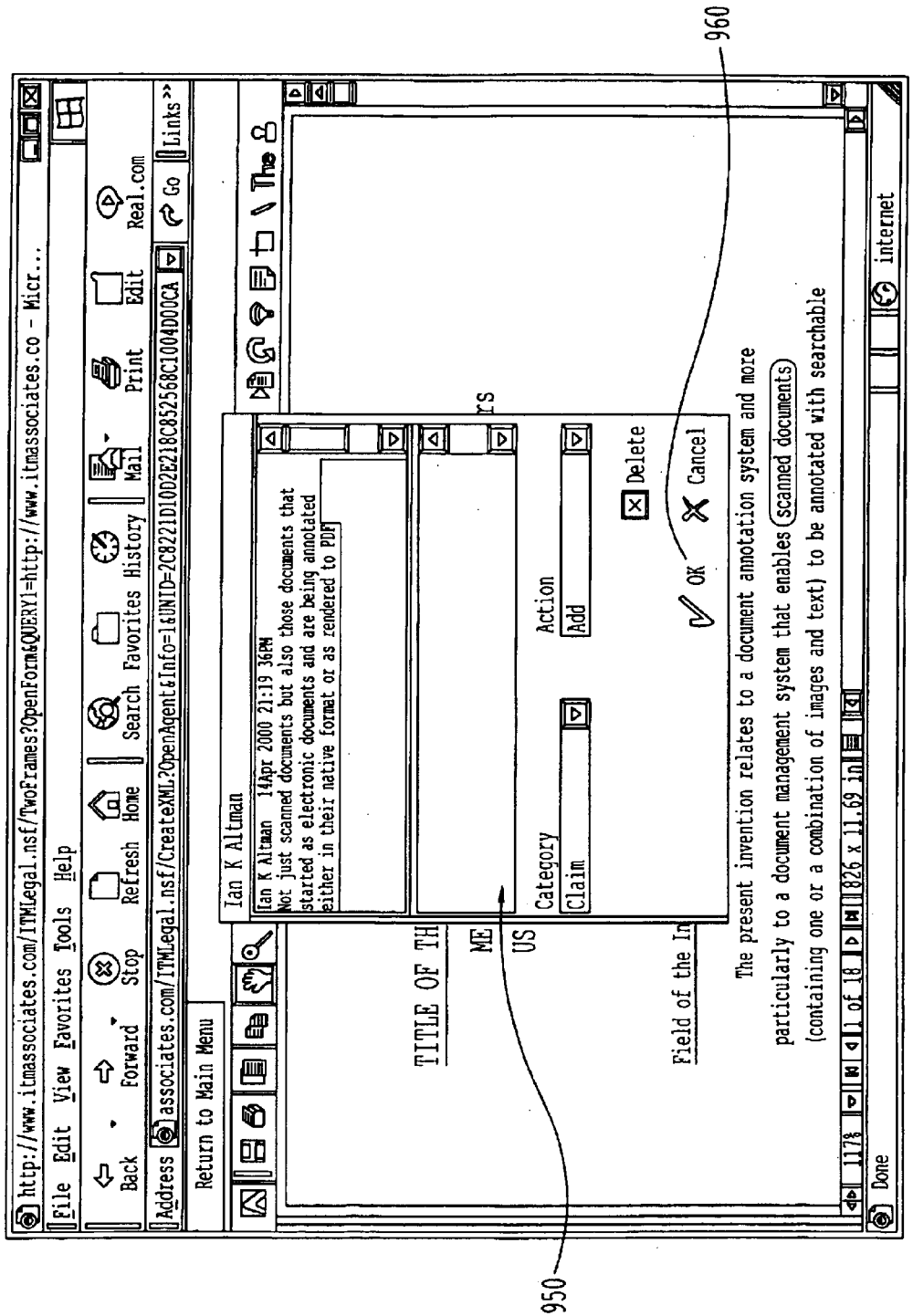
FIG. 9B is a screen capture showing an annotation of the electronic document of FIG. 9A.

The supplemental toolbar 910 includes icons 920A through 920G for (A) refreshing the annotations, (B) filtering annotations, (C) inserting new annotations, (D) draw a rectangle, (E) highlight text or graphics, (F) strikeout text or graphics, and (G) stamp a document. Also illustrated is a text annotation 925. By selecting that annotation (e.g., by double clicking on it), the text of the annotation is brought up (e.g., in a dialog box as shown in FIG. 9B). In one embodiment of the present invention, it is possible to add text to the annotation by typing in the text box 950 and selecting the OK button 960. Preferably, the added text is stored as its own record, thereby enabling the original record not to have to be locked during the add operation. This reduces contention for individual records and speeds the addition process.

Figure 10:
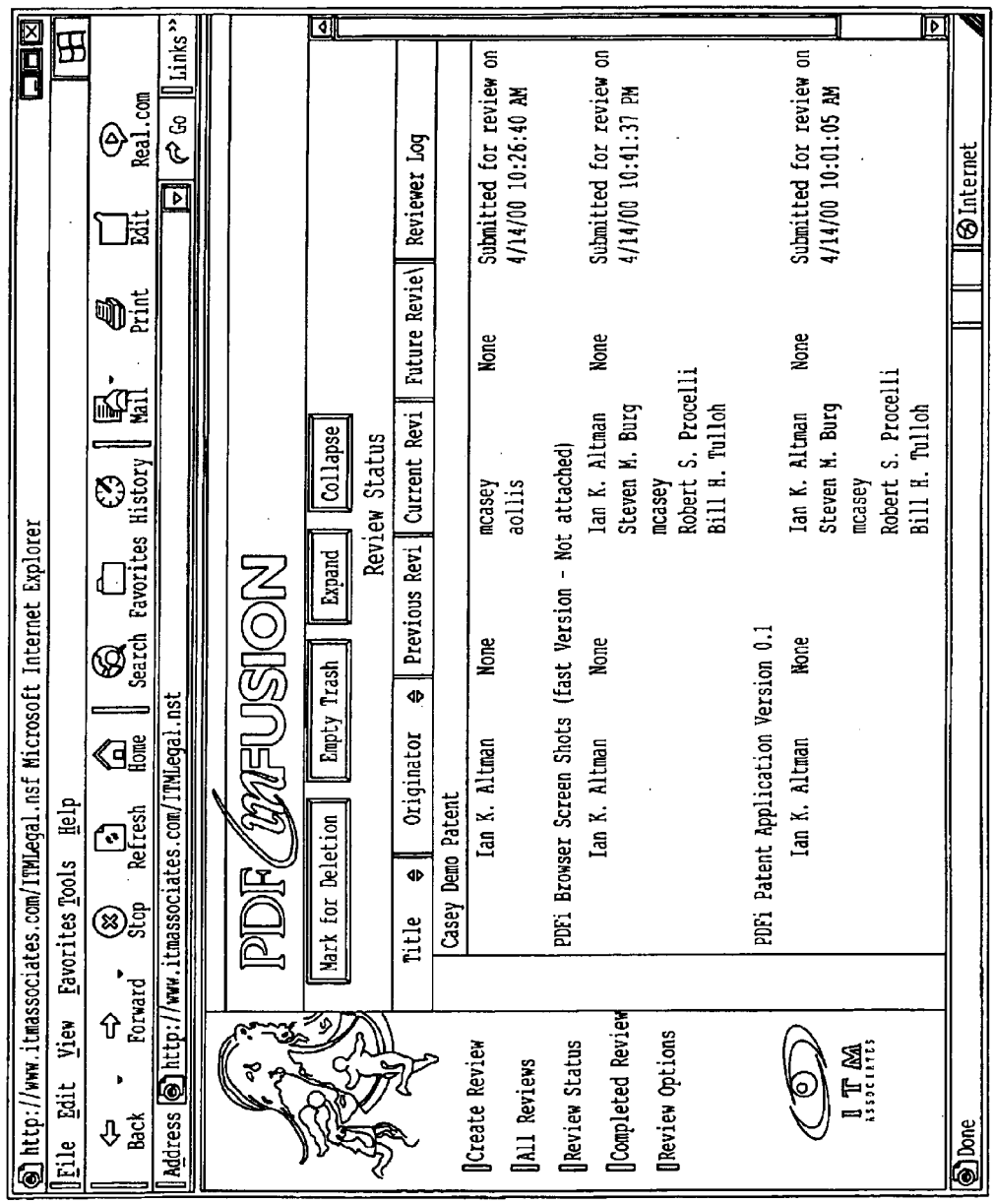
FIG. 10 is a screen capture showing the status of reviews of a set of reviews of FIG. 8A that are accessible by a user.

FIG. 10 is a screen capture showing the status of reviews of a set of reviews of FIG. 8A that are accessible by a user. None of the documents are scheduled for future review, and each document was submitted at a different time.

Figure 11:
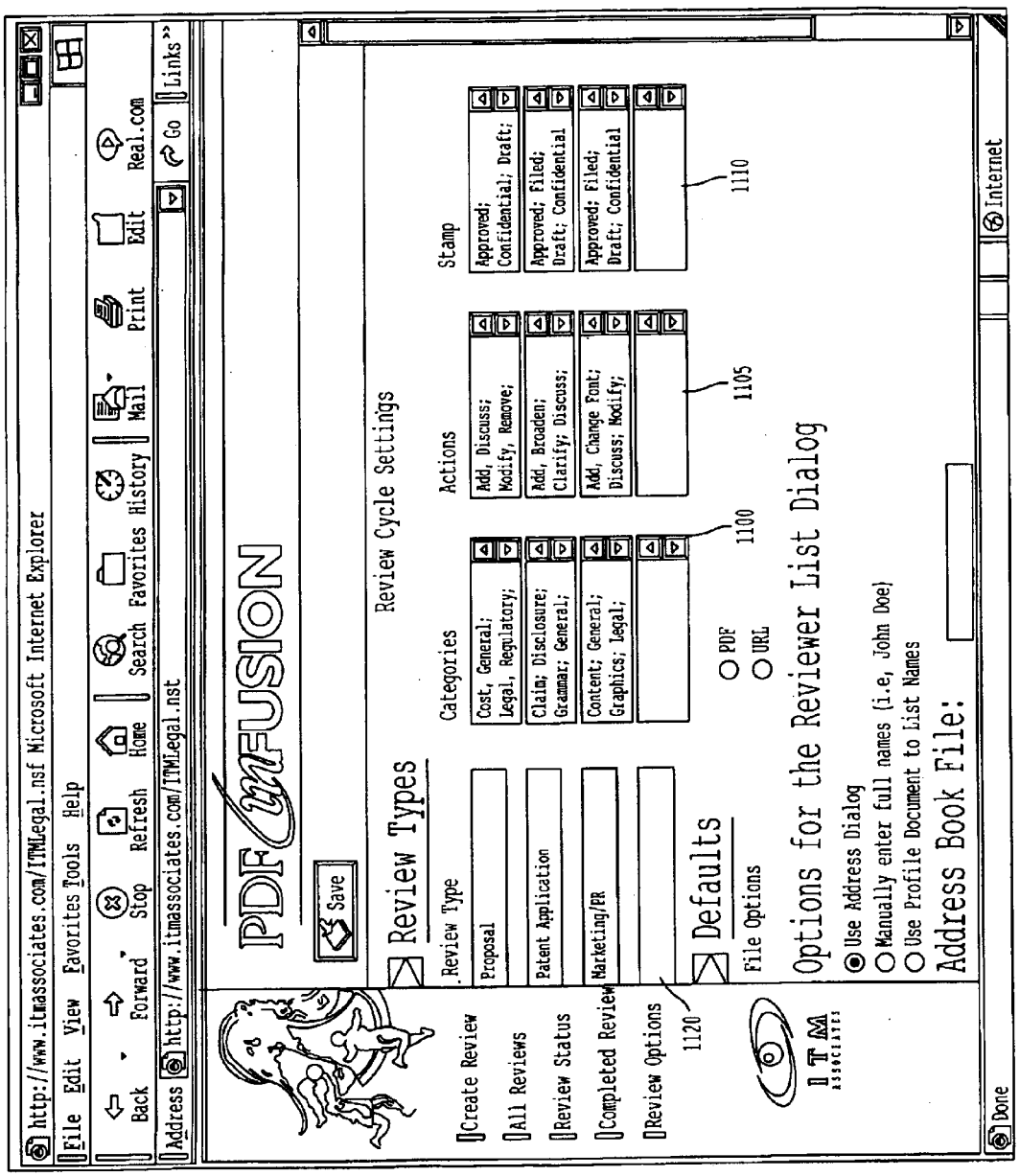
FIG. 11 is a screen capture showing the options for a set of reviews of FIG. 8A that are accessible by a user.

FIG. 11 is a screen capture showing the options for a set of reviews of FIG. 8A that are accessible by a user. The categories 1100, actions 1105, and stamps 1110 change depending on the review type 1120 being specified. For example, the Patent Application type includes a "claim" category that is not applicable to the proposal and marketing/PR types since proposals and marketing materials do not contain claims.

Figure 12:
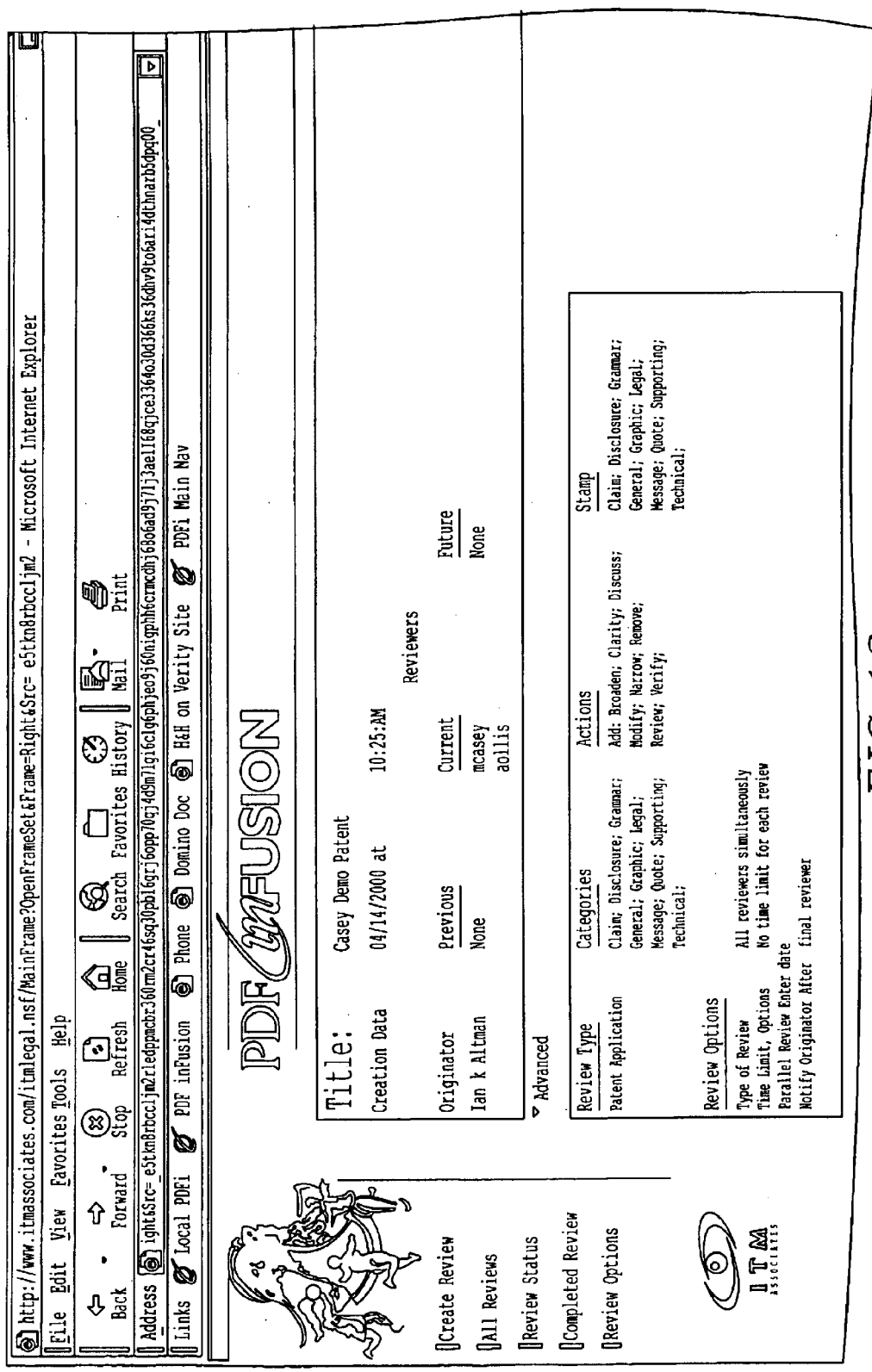
FIG. 12 is a screen capture showing the review information, including a list of reviewers, for the first document of FIG. 8A.

Once the information of FIG. 11 is entered into a long-term repository (e.g., database on the information server), it can be queried to determine a current status of the review options. FIG. 12 is a screen capture showing the review information, including a list of reviewers, for the first document of FIG. 8A.

Figure 13A:
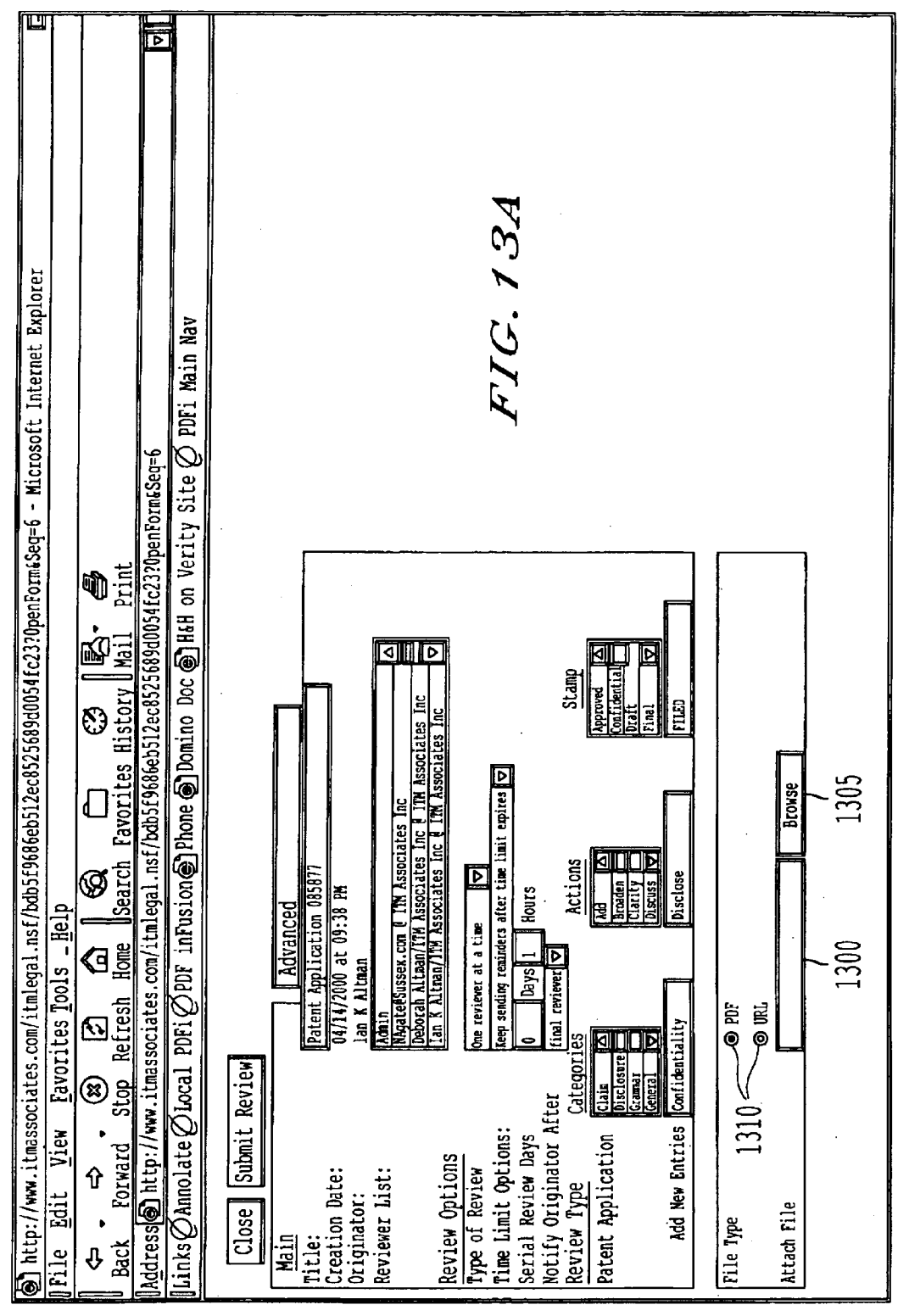
Figure 13B:
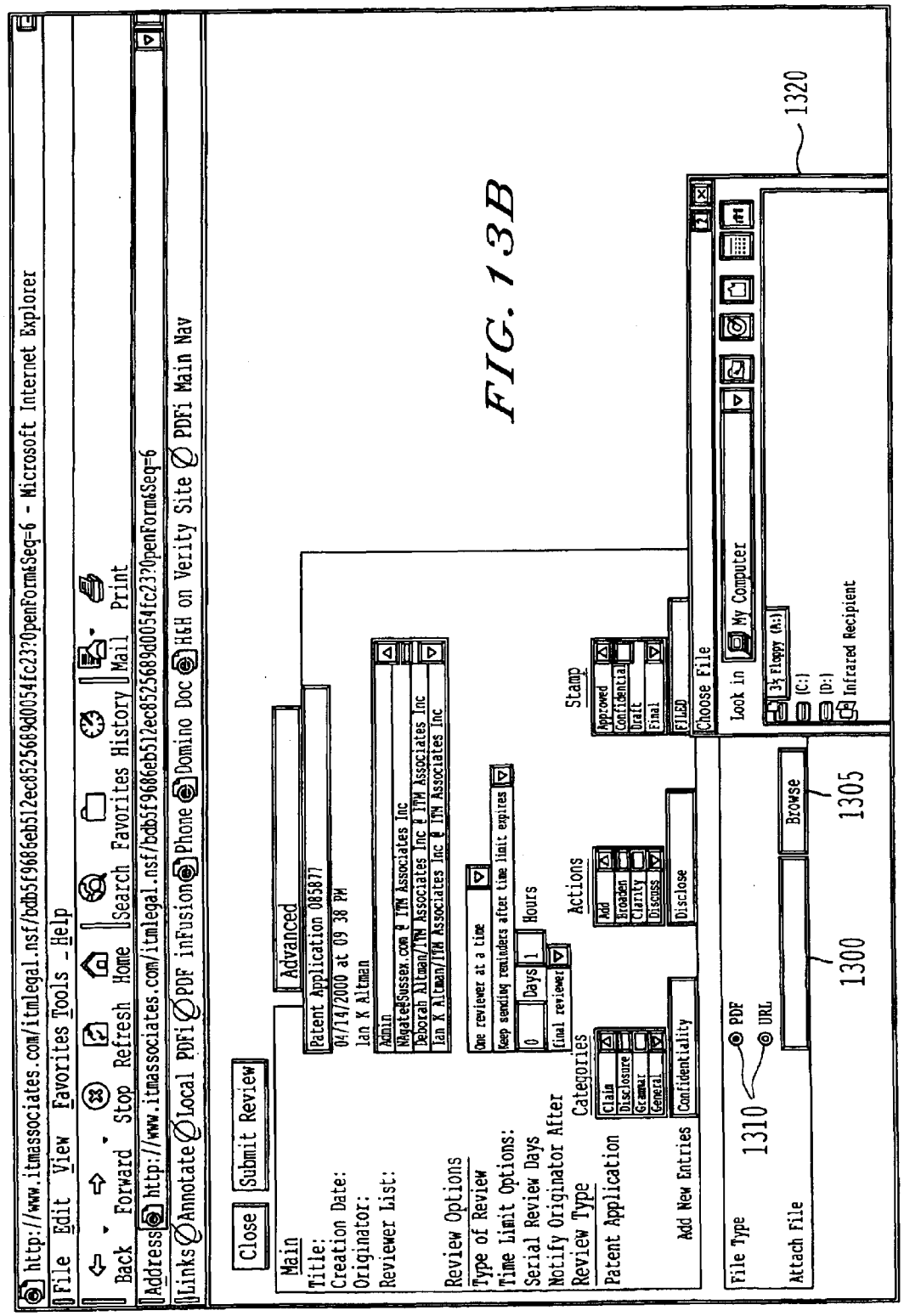
FIG. 13B is a screen capture of an exemplary interface for creating a review of a document specified via the browse dialog box.

FIG. 13A is a screen capture of an exemplary interface for creating a review of a document. By specifying a file name in the "attach file" box 1300, an electronic document is selected to have the specified attributes. In an alternate embodiment of the present invention, as shown in FIG. 13B, the file name specified by selecting the browse button 1305 which brings up the browse dialog box 1320. Using either interface, the file type should be specified (e.g., using radio buttons 1310).

Figure 14A:
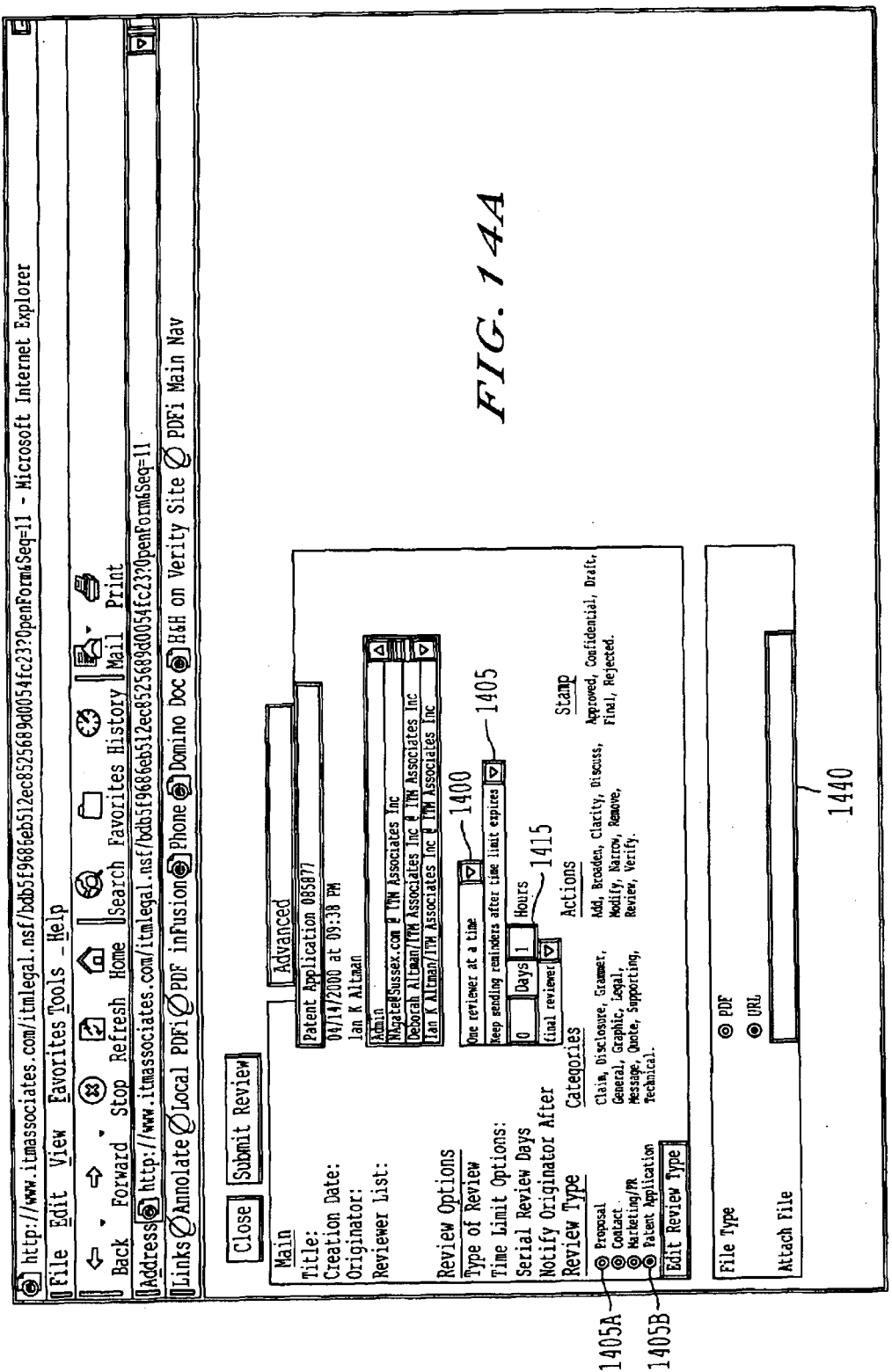
FIG. 14A is a screen capture of an exemplary interface showing the patent review options of a document selected in FIG. 13A or 13B, using one reviewer at a time.

Once a review has been specified for a document, changes in the review options can be made by selecting a hyperlink to the document or by using the filename box 1440 (FIG. 14A). The review types 1120 of FIG. 11 are converted to radio buttons (e.g., 1405A and 1405B) that can be selected as shown in FIG. 14A. In the illustrated embodiment of the user interface, for the patent application review type 1405A, the user has selected, via drop down box 1400, to perform a serial review using one reviewer at a time. To "encourage" the reviewer to complete the review within the period set in the time area 1415, the drop down box 1405 establishes that the e-mail reminders are to be sent until the review has been completed. This prevents one user from holding up the entire review process. The reviewer can then specify other options for the proposal review type 1405B, as shown in FIG. 14B.

Figure 15:
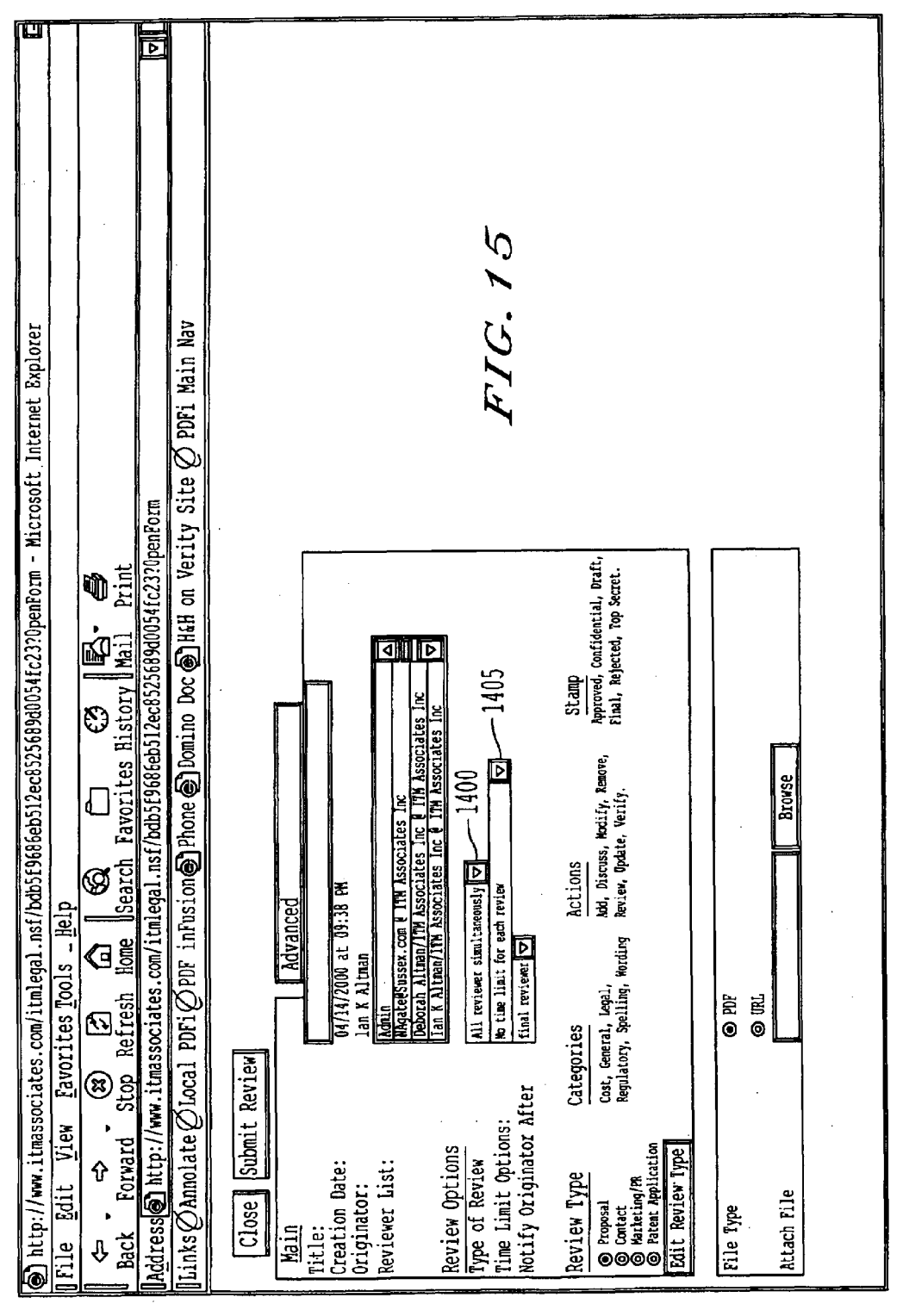

In an alternate embodiment of the present invention, as shown in FIG. 15, the type of review drop-down box 1400 enables the user to select to use parallel review between all reviewers simultaneously. Although a time limit could be specified, the user has selected, using drop-down box 1405, to specify that there is no time limit on when reviews must be completed. However, had the user selected, using drop-down box 1405, that there is a time limit, then an additional "Parallel review enter date" field 1420 would appear to enable the user to select that date.

Once a reviewer no longer wishes to submit additional annotations, the user notifies the system that he/she has finished reviewing a specified document. Such a notification can be made using a plug-in, on a separate web page, or by e-mail. Upon receipt of such a notification, the system records that the review is complete and removes the reviewer from the list of people to get reminders. In one embodiment, the submission of a review also triggers a message to the document "owner" or coordinator to notify the owner that one fewer review is outstanding. The message may include one or a combination of the names/user ids of (1) those people who have submitted reviews and (2) those people who are still expected to submit a review but have not.

As discussed above, FIG. 17 is a screen capture of an exemplary interface showing the rules triggered by a category, action or stamp. In the illustrated example, an e-mail notification is sent to "mcasey@notarealdomainname.com" when a legal issue is added to the document or a follow-up is added.

Figure 18A:
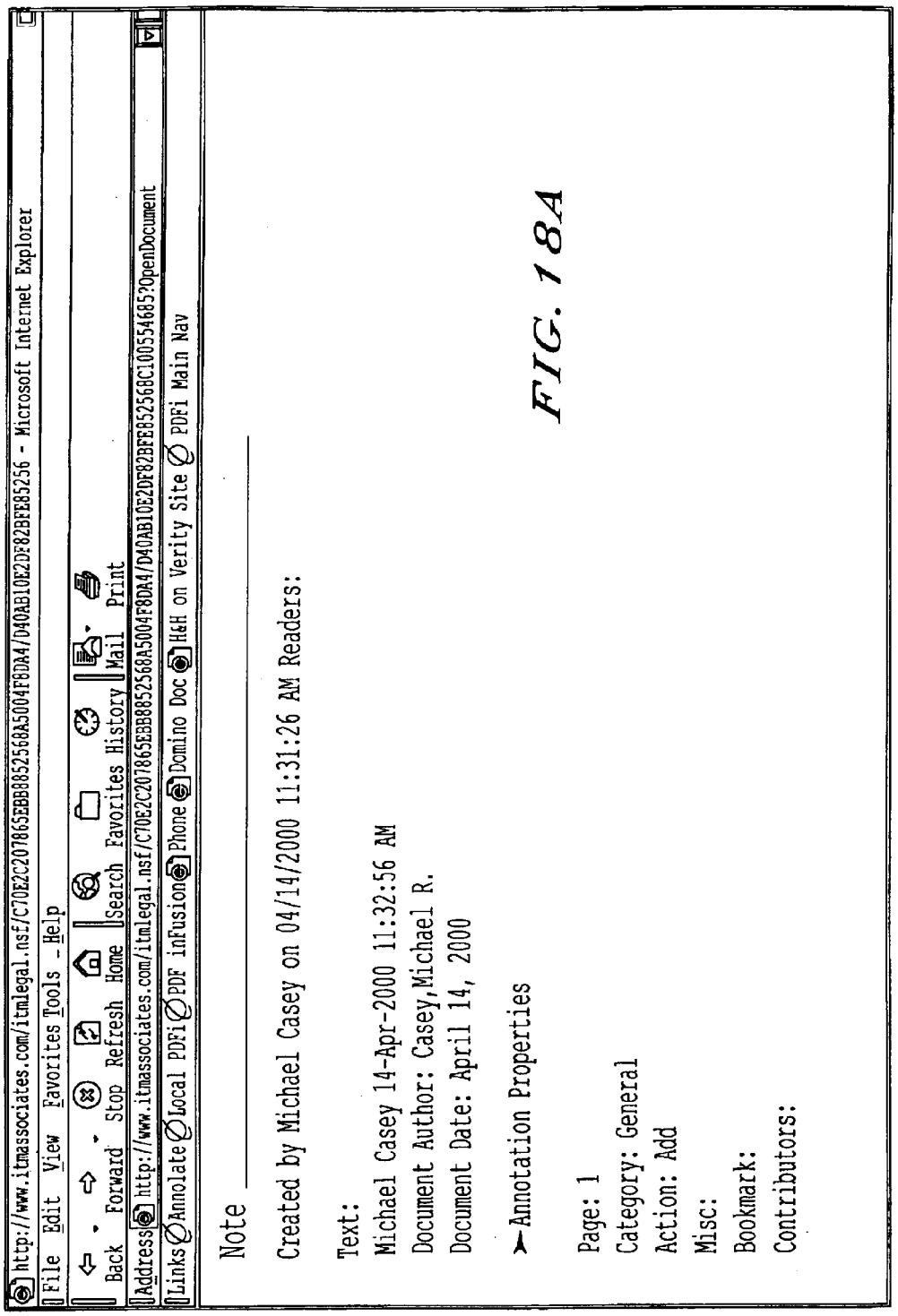
FIG. 18A is a screen capture of an annotation added to a document.
Figure 18B:
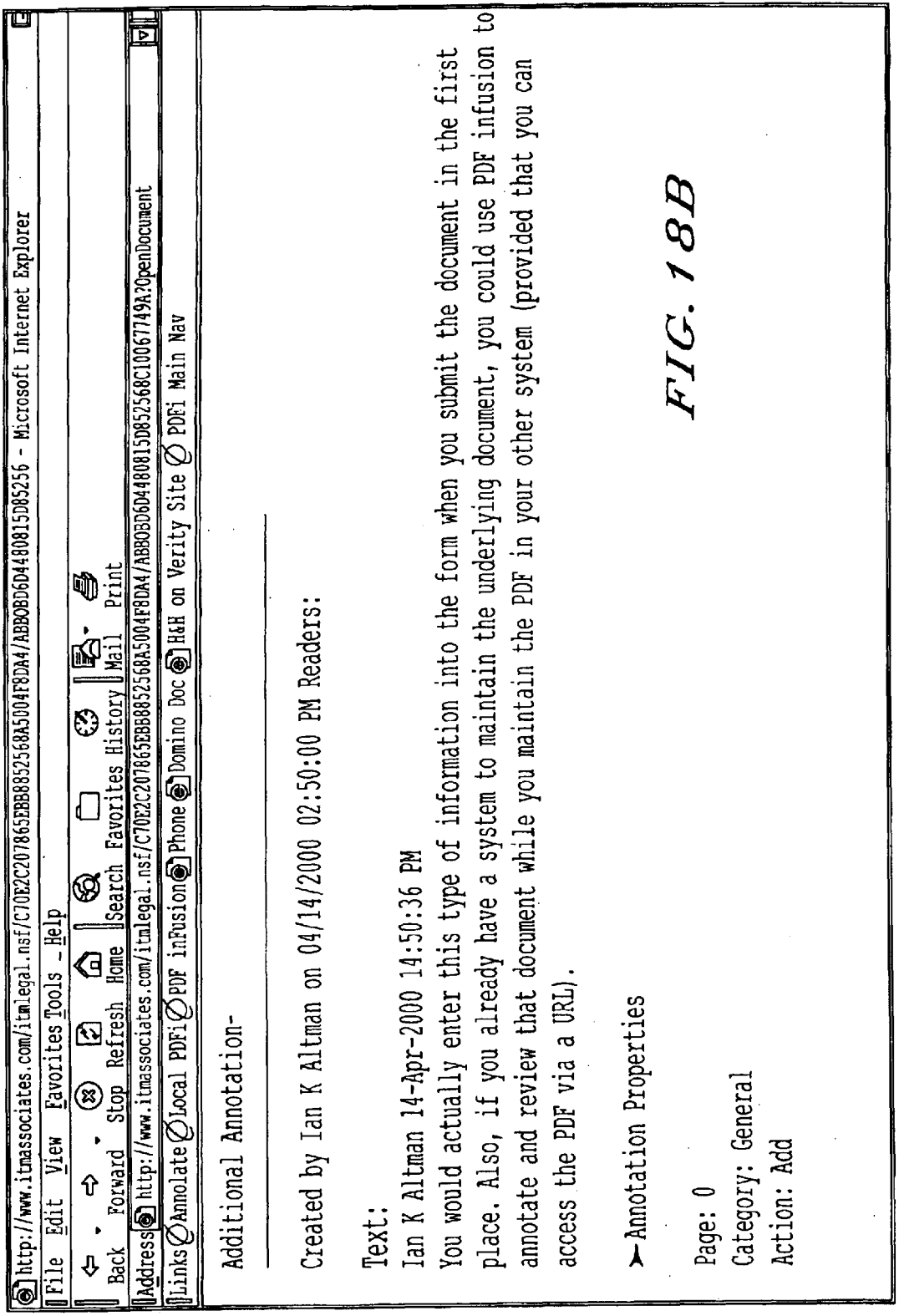
FIG. 18B is a screen capture of a follow-up to the annotation of FIG. 18A.

FIG. 18A is a screen capture of a general annotation added to a document. It was subsequently followed up by an additional annotation as shown in FIG. 18B.

Figure 19:
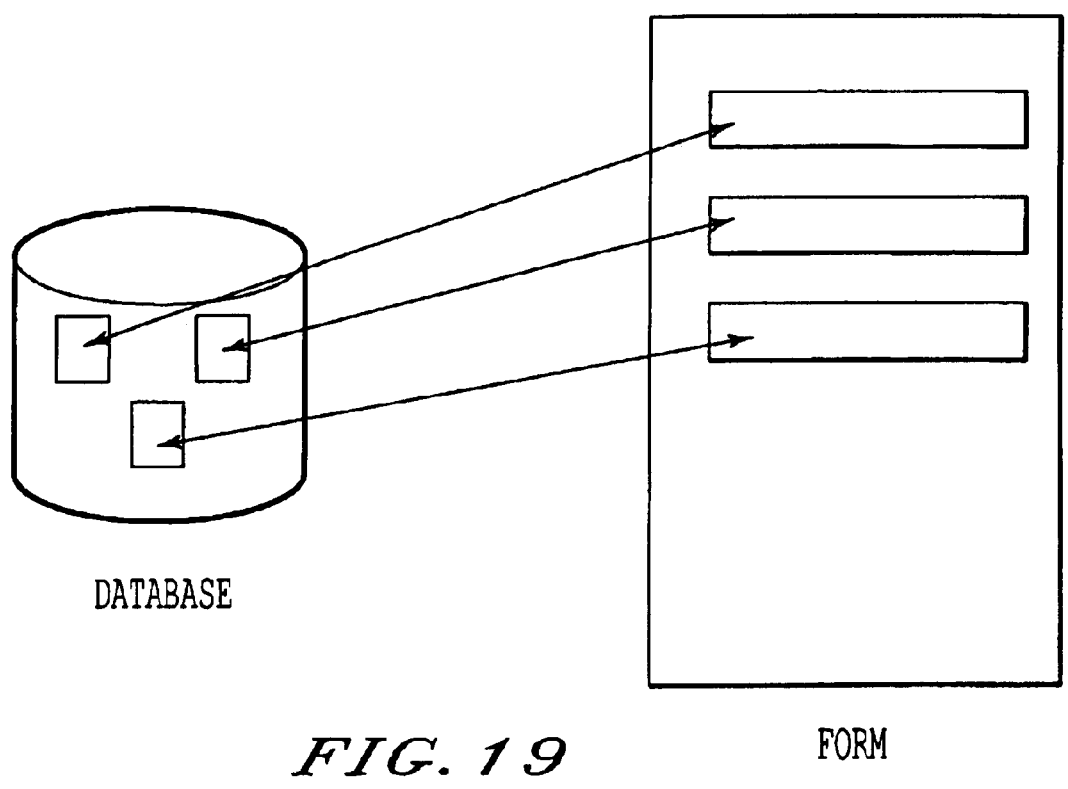
FIG. 19 is a block diagram of interactions between a database for storing form fields and a form in which fields can be populated.

In light of the movement of data from database to documents and back again, the present invention also includes a method, system and computer program product for populating forms with data from a database, as shown in FIG. 19. Using the same technique as described above, by submitting the form using the second plug-in, the second plug-in can parse the form fields to store their corresponding values into the database. Similarly, a form pulled up can be populated by the by querying the database for previously stored values.

Obviously, numerous modifications and variations of the present invention are possible in light of the above teachings. It is therefore to be understood that, within the scope of the appended claims, the invention may be practiced otherwise than as specifically described herein.

What is claimed is:

1. A computer program product, comprising:
 a computer storage medium and a computer program code mechanism embedded in the computer storage medium for causing a computer to separately manage an original document and annotations for the original document, the computer program code mechanism comprising:
  a first computer code device configured to authenticate a first user to a remote database;
  a second computer code device configured to receive an original document stored in a first file repository;
  a third computer code device configured to create, by the first user, at least one of a text annotation and a graphical annotation for the original document;
  a fourth computer code device configured to overlay the original document and the at least one of a text annotation and a graphical annotation without changing a contents of the original document; and
  a fifth computer code device configured to utilize TCP/IP communications to send the at least one of a text annotation and a graphical annotation to the remote database and to receive from the remote database at least one annotation from a second user reviewing the original document in parallel with the first user.

2. The computer program product as claimed in claim 1, wherein the first through fifth computer code devices comprise a plug-in to a markup language browser.

3. The computer program product as claimed in claim 1, wherein the original document comprises an ADOBE ACROBAT document.

4. The computer program product as claimed in claim 1, wherein the second computer code device comprises a sixth computer code device configured to receive a form document illustrating at least one form field; and wherein the third computer code device comprises a seventh computer code device configured to create a text annotation by extracting a contents of the at least one form field.

5. The computer program product as claimed in claim 1, wherein the third computer code device comprises a sixth computer code device configured to specify a corresponding category for the at least one of a text annotation and a graphical annotation.

6. The computer program product as claimed in claim 5, further comprising a seventh computer code device configured to select a trigger type for execution based on the category specified for the at least one of a text annotation and a graphical annotation.

7. A computer-implemented method comprising:

(a) authenticating a first user to a remote database;

(b) receiving an original document stored in a first file repository;

(c) creating, by the first user, at least one of a text annotation and a graphical annotation for the original document;

(d) overlaying the original document and the at least one of a text annotation and a graphical annotation without changing a contents of the original document; and (e) utilizing TCP/IP communication to send the at least one of a text annotation and a graphical annotation to the remote database and to receive from the remote database at least one annotation from a second user reviewing the original document in parallel with the first user.

8. The method as claimed in claim 7, wherein the steps (a)–(e) are performed by a plug-in to a markup language browser.

9. The method as claimed in claim 7, wherein the original document comprises an ADOBE ACROBAT document.

10. The method as claimed in claim 7, wherein the step (b) comprises receiving a form document illustrating at least one form field; and wherein the step (c) comprises creating a text annotation by extracting a contents of the at least one form field.

11. The method as claimed in claim 7, wherein the step (c) comprises specifying a corresponding category for the at least one of a text annotation and a graphical annotation.

12. The method as claimed in claim 11, further comprising selecting a trigger type for execution based on the category specified for the at least one of a text annotation and a graphical annotation.

13. The method as claimed in claim 11, further comprising triggering a category-specific trigger based on the category specified for the at least one of a text annotation and a graphical annotation.

14. A system for separately managing an original document and annotations for the original document, the system comprising:

an authentication device configured to authenticate a first user to a remote database;

a receiver configured to receive an original document stored in a first file repository;

an input device configured to create, by the first user, at least one of a text annotation and a graphical annotation for the original document;

an overlay circuit configured to overlay the original document and the at least one of a text annotation and a graphical annotation without changing a contents of the original document; and a transceiver configured to utilize TCP/IP communications to send the at least one of a text annotation and a graphical annotation to the remote database and to receive from the remote database at least one annotation from a second user reviewing the original document in parallel with the first user.

* * * * *